(12) United States Patent
Hui et al.

(10) Patent No.: US 10,925,342 B2
(45) Date of Patent: Feb. 23, 2021

(54) HELMET COMMUNICATION AND SAFETY SYSTEM

(71) Applicant: BITwave Pte Ltd, Singapore (SG)

(72) Inventors: Siew Kok Hui, Singapore (SG); Eng Sui Tan, Singapore (SG); Yung Kuei Gan, Singapore (SG)

(73) Assignee: BITwave Pte Ltd, Singapore (SG)

( * ) Notice: Subject to any disclaimer, the term of this patent is extended or adjusted under 35 U.S.C. 154(b) by 0 days.

(21) Appl. No.: 16/453,987

(22) Filed: Jun. 26, 2019

(65) Prior Publication Data

US 2020/0000166 A1 Jan. 2, 2020

Related U.S. Application Data

(60) Provisional application No. 62/690,923, filed on Jun. 27, 2018, provisional application No. 62/700,185, filed on Jul. 18, 2018.

(51) Int. Cl.
| | |
|---|---|
| *G01S 19/17* | (2010.01) |
| *A42B 3/04* | (2006.01) |
| *G06F 3/048* | (2013.01) |
| *G06F 3/16* | (2006.01) |
| *G01S 19/25* | (2010.01) |

(52) U.S. Cl.
CPC ............... *A42B 3/04* (2013.01); *G01S 19/17* (2013.01); *G01S 19/25* (2013.01); *G06F 3/048* (2013.01); *G06F 3/165* (2013.01)

(58) Field of Classification Search
CPC .......................................... G06F 3/04
See application file for complete search history.

(56) References Cited

U.S. PATENT DOCUMENTS

| | | | |
|---|---|---|---|
| 2016/0360817 A1* | 12/2016 | Lombard | ............ F21V 33/0008 |
| 2019/0248275 A1* | 8/2019 | Cook | ................... B60Q 1/2676 |

\* cited by examiner

*Primary Examiner* — Michael T Vu
(74) *Attorney, Agent, or Firm* — Amin, Turocy & Watson, LLP

(57) ABSTRACT

Various helmet communication, entertainment, and safety techniques are enabled. For instance, a method comprises receiving, by a helmet user-interface system comprising a processor, an output from a sensor, determining, by the helmet user-interface system, whether the output comprises gesture information representative of a gesture, in response to the determining and based on a condition being determined to be satisfied, identifying, by the helmet user-interface system, a gesture type associated with the gesture information, and executing, by the helmet user-interface system, a function associated with the gesture type.

20 Claims, 37 Drawing Sheets

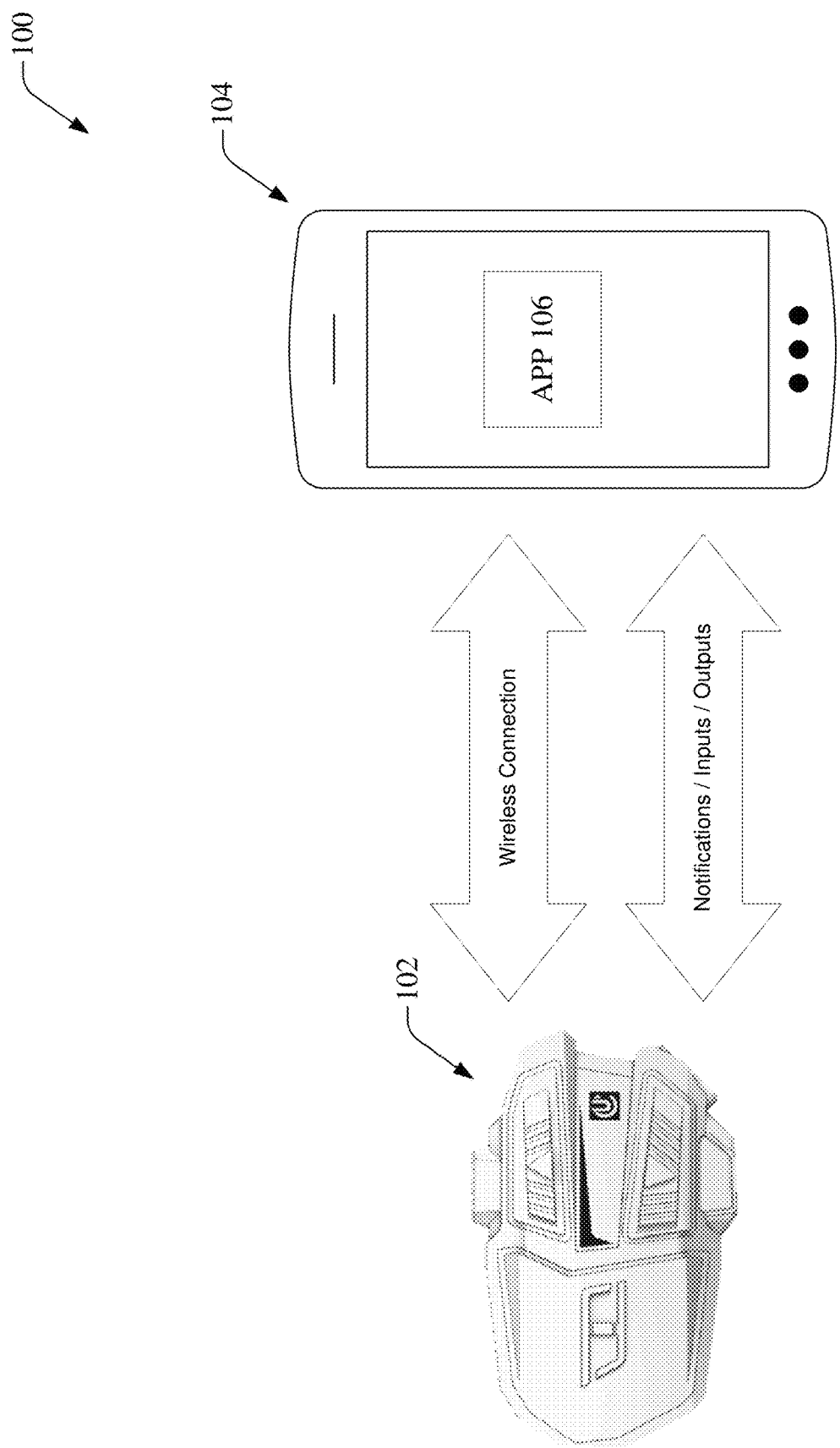

CROWN

HELMET COMMUNICATION AND SAFETY SYSTEM

CROSS REFERENCE TO RELATED APPLICATION

The subject patent application claims priority to U.S. Provisional Patent Appln. No. 62/690,923, filed Jun. 27, 2018, entitled "System and Apparatus for the Control of a Helmet Communication and Entertainment System" and U.S. Provisional Patent Appln. No. 62/700,185, filed Jul. 18, 2018, entitled "System and Apparatus for helmet crash detection, classification and reporting." The entireties of the aforementioned applications are hereby incorporated by reference herein.

TECHNICAL FIELD

The present disclosure generally relates to helmet communication, entertainment, and safety.

BACKGROUND

For a variety of reasons, an increasing number of people are utilizing two and three wheeled vehicles for transportation, as well as other four or more wheeled vehicles that implicate head wear for safety, such as all-terrain vehicles (ATVs) and side-by-sides (UTVs). For example, bicycles, motorcycles, dirt-bikes and other like-vehicles have become popular methods of transportation and recreation. When compared to traditional cars, utilization of such vehicles can reduce road congestion, reduce fuel consumption and harmful emissions, and provide users with a more exhilarating experience. Unfortunately, according to NHTSA DOT HS 812 492, there were 5,286 motorcyclists killed in 2016—a 5.1% increase from the 5,029 motorcyclists killed in 2015. Per vehicle miles traveled in 2016, motorcyclist fatalities occurred nearly 28 times more frequently than passenger car occupant fatalities in traffic crashes. Thus, since wearing headgear or a helmet by itself has not reduced accidents and also has done nothing to do with facilitating a responder to arrive more quickly, improvements in one or both categories could help save more lives.

While many riders travel with smartphones and Bluetooth® communicators, these devices are difficult to use while riding. Some of these devices require physical input with screens or buttons, which is awkward, distracting, and can cause a rider to take his or her hands off handlebars for too long. Use of gloves, which many riders use for safety, increase difficulty of control or manipulation of buttons and screens. Other devices use voice activation, which can be inaccurate due to wind and engine noises. Furthermore, even if a rider capable of safety interacting a communication device, such a device can only help a rider in the case of a crash if the rider is conscious and able to use said device.

The above-described background relating to vehicle safety is merely intended to provide a contextual overview of some current issues and is not intended to be exhaustive. Other contextual information may become further apparent upon review of the following detailed description.

SUMMARY

The following summary is a general overview of various embodiments disclosed herein and is not intended to be exhaustive of limiting upon the disclosed embodiments. Embodiments are better understood upon consideration of the detailed description below in conjunction with the accompanying drawings and claims.

In one embodiment, a method is described herein. The method comprises receiving, by a helmet user-interface system comprising a processor, an output from a sensor, determining, by the helmet user-interface system, whether the output comprises gesture information representative of a gesture, in response to the determining and based on a condition being determined to be satisfied, identifying, by the helmet user-interface system, a gesture type associated with the gesture information, and executing, by the helmet user-interface system, a function associated with the gesture type.

In another embodiment, a method is described herein. The method comprises receiving, by a helmet safety system comprising a processor, an output from an accelerometer of the helmet safety system, based on the output, determining, by the helmet safety system, a g-force value associated with a changing velocity of the accelerometer, comparing, by the helmet safety system, the g-force value with a g-threshold value, and based on the g-force value being determined to be larger than the g-threshold value, outputting, by the helmet safety system, information indicative of the g-force value.

In a further embodiment, a system is described herein. The system comprises a mobile device comprising a mobile application installed and executing thereon, a processor, and a memory that stores executable instructions that, when executed by the processor, facilitate performance of operations, comprising: receiving, from a helmet communicator, information indicative of an impact, and in response the receiving, and based upon a condition being determined to be satisfied, transmitting a signal to a recipient registered with the mobile application as authorized to receive the signal.

DESCRIPTION OF DRAWINGS

Various non-limiting embodiments of the subject disclosure are described with reference to the following figures, wherein like reference numerals refer to like parts throughout unless otherwise specified.

FIGS. 1A-1G are diagrams depicting systems, system components, processes, and methods relating to communication, entertainment, and safety in accordance with one or more embodiments described herein.

DETAILED DESCRIPTION

Figure 1C:
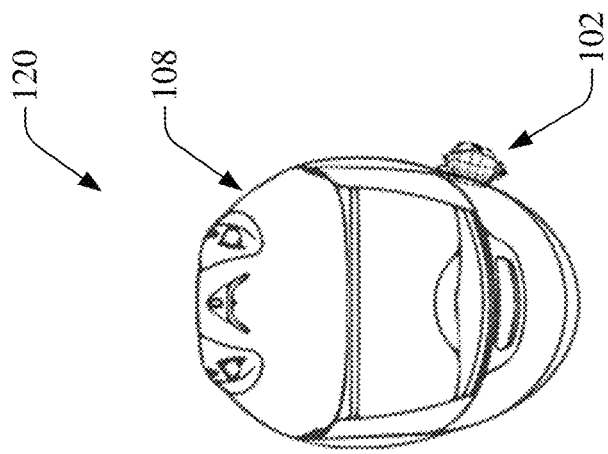

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide methods, systems, and user interfaces that facilitate using a communicator device (e.g., a helmet communicator) in connection with a mobile device (e.g., a smartphone, smartwatch, fitness tracker, or other portable electronic device) to facilitate communication, entertainment, and safety. Various embodiments herein allow a rider to safely communicate and control functions of devices while assisting with communications when a rider is injured or impaired. For example, a communicator device can comprise a member of the UCLEAR MOTION or UCLEAR AMP series of helmet communicators or a different communicator device. Mobile devices can include Apple® iPhone® devices, Apple Watch® devices, devices running a Google™ Android™ operating system, and others. Various wireless communication protocols (e.g., Bluetooth, Wi-Fi, cellular, physical connections, etc.) can be utilized for connections between a communicator device and a mobile device, or other parings of devices. While various examples provided herein refer primarily to the specific cases of Bluetooth and Wi-Fi enabled devices, it can be appreciated that these are merely examples of devices that could employ the embodiments described herein, and such examples are not intended to limit the claimed subject matter unless explicitly stated otherwise.

By utilizing the systems and methods provided herein, a communicator (e.g., a helmet communicator) can perform a variety of functions. For example, a communicator can detect gestures (e.g., hand motions satisfying certain criteria) by a user of the communicator. A large variety of gestures can be utilized to represent various respective inputs. Gestures can be preconfigured for a user. Gestures can alternatively be user-configurable or adjustable, thus allowing a user to modify or record a gesture and map that gesture to a function. According to an exemplary embodiment, a gesture can cause a connected mobile device to answer or reject an incoming telephone call. Additionally, a communicator can be connected (wirelessly or physically) to a mobile device or to a speaker or headphones. The mobile device can supply audio, such music, and the corresponding sound can be broadcast from the headphones. A gesture received by the communicator can control music functions, such as volume increase or decrease, play, pause, skip track, previous track, shuffle, repeat, like song, add to playlist, fast forward, rewind, etc. In sum, embodiments described above can provide for techniques by which a communicator can receive gestures and convert said gestures into a command for the communicator, mobile device, or other recipient.

In other, various embodiments described herein, a communicator can include safety features. For instance, a communicator can utilize an accelerometer, compute a g-force (g-value) from acquired accelerometer data, and compare the computed g-value with a g-force threshold (g-threshold). G-thresholds can be set by, for example, government mandates or recommendations, user-preference, manufacturer specifications, etc. If a detected g-value is larger than a g-threshold, a communicator can output information or a signal. The information or signal can include information indicative of the g-value, location or direction of impact, potential symptoms associated with that g-value or impact, movement after the impact, health data such as allergies, pre-existing conditions, insurance information, emergency contacts, next-of-kin, etc. In an embodiment, a communicator can output such information to a mobile device running a mobile application. A communicator can additionally cause the mobile device to make calls, send text messages, send emails, etc., in relation to such information.

In other embodiments, the communicator can comprise cellular components, thus enabling the communicator to output the above information directly over a cellular network without needing a mobile device to facilitate an output over a cellular network. In further embodiments, the communicator can output information to other communicators (e.g., like-communicators or other models), for example, over a communicator mesh network.

According to an embodiment, a delay can exist (e.g., 30 seconds) between a g-value exceeding a g-threshold and outputting information in order to allow a user to prevent a false-alarm. For example, a user could accidentally drop a helmet having a communicator attached thereon, causing an impact with a corresponding g-value exceeding a g-threshold. A distress message can be prevented by user intervention during the delay period. A button sequence, gesture sequence, voice command, mobile application input, etc., can stop the distress message before the delay period ends.

Further embodiments herein relate to operations of a mobile device having a mobile application installed thereon. In response to a condition (e.g., crash, impact, etc.) detected by a communicator, a mobile application can receive information indicative of the condition from the communicator. The information can be logged at the mobile application or elsewhere, for example, on a remote server. The mobile application can transmit information indicative of the condition. The transmission can include location data (e.g., global positioning system coordinates, street address, etc.), health data (e.g., the g-value, location or direction of impact, potential symptoms associated with that g-value or impact, movement after the impact, health data such as allergies, pre-existing conditions, insurance information, emergency contacts, next-of-kin, etc.) associated with the condition. The transmission can be sent, for example, via telephone call, text message, email, push notification, communicator mesh network, etc. to a variety of recipients. Recipients can be configured by a user, government entity, manufacturer, etc., and can comprise one or a plurality of recipients. The mobile application can determine an emergency healthcare institution nearby the condition. For example, the mobile application provide a list of hospitals nearby for a user to choose from. The mobile application can additionally compare nearby hospitals to hospitals that accept a user's insurance or are preferred by a user. Accordingly to an embodiment, a mobile application can contact a best-fitting hospital in response to the condition.

The above aspects of the disclosure and/or other features of respective embodiments thereof are described in further detail with respect to the respective drawings below.

With reference to FIGS. 1A-1G, illustrated are a series of example, non-limiting implementations of a communicator system. It should be appreciated that additional manifestations, configurations, implementations, protocols, etc. can be utilized in connection with the following components described herein or different/additional components as would be appreciated by one skilled in the art.

With reference to FIG. 1A, diagram 100 illustrates a communicator 102 is communicatively coupled to a mobile device 104 having a mobile application 106 installed thereon. The communicator 102 can be, for example, a member of the UCLEAR Motion series of devices, UCLEAR AMP series of devices, or a difference device altogether. Communicator 102 can comprise a variety of sensors, such as proximity sensors (e.g., capacitive, Doppler effect, Eddy-current, inductive, magnetic, optical, photoelectric, photocell, laser, radar, sonar, ultrasonic, etc.), audio sensors (e.g., microphone), g-sensor (e.g., accelerometer) and buttons (e.g., physical, touch-sensitive, etc.). The communicator 102 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, global system for mobile communications ("GSM"), code-division multiple access ("CDMA"), satellite, visual cues, radio waves, UCLEAR DynaMESH, mesh network, etc.). The communicator 102 can possess ports for physical connection to peripherals (e.g., speakers, headphones/earbuds, mobile devices, displays, external controllers, other communicators, etc.) and can comprise heads-up displays, screens, cameras, microphones, etc. The communicator 102 can be battery (internal or external) powered or can utilize other power sources such as a mobile device, an automobile such as a motorcycle, electromagnetic induction, etc.

The communicator 102 can be communicatively coupled to a mobile device 104. Mobile device 104 can comprise Apple® iPhone® devices, Apple Watch® devices, devices running a Google™ Android™ operating system, and others. Mobile device 104 can have a mobile application ("APP") 106 installed thereon. Mobile device 104 can be physically coupled to the communicator 102 (e.g., connected by wire) or wirelessly connected to the communicator 102 by Bluetooth, Wi-Fi, etc. as indicated in FIG. 1A. Mobile application 106 can be implemented to provide additional functionality for the communicator 102, facilitate operations of the mobile device 104 or communicator 102, or facilitate operations of other communicatively coupled devices, such as smart devices (e.g., smart plugs, connected appliances, vehicles, security systems, etc.).

The communicative coupling between the communicator 102 and mobile device 104 can allow for bi-directional transfer of information, notifications, communications, etc. For example, a communicator 102 can play music stored on or streamed by a mobile device 104 over speakers of the communicator 102 or a peripheral communicatively coupled to the communicator 102 such as speakers, headphones or earbuds. Various gestures observed by the communicator 102, as will be later described in greater detail, can control the music playback, such as volume increase or decrease, play, pause, skip track, previous track, shuffle, repeat, like song, add to playlist, fast-forward, rewind, etc.

The communicative coupling between the communicator 102 and mobile device 104 can also allow for telephone calls operated by the mobile device 104 to be controlled and conducted by the communicator 102. Various gestures observed by the communicator 102 can control a call such as answer/end/reject a call, increase/decrease volume, mute microphone, etc.

The communicative coupling between the communicator 102 and mobile device 104 can also facilitate a transfer of location data, health data, etc., associated with a safety condition.

Figure 1B:
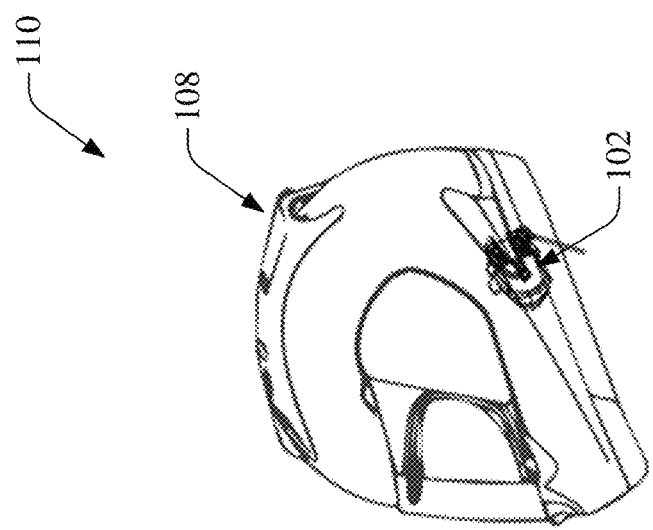

Turning to FIGS. 1B and 1C and diagrams 110 and 120, it can be appreciated that the communicator 102 can be configured to attach to a helmet 108. The communicator 102 can attach directly to a helmet 108 or can be attached to the helmet 108 by an intermediate bracket. Attachment methods can include, adhesives, click and lock, hook and loop, snap-fit, etc. Attachment can be permanent or a communicator can be removably attached to a helmet 108. Communicator 102 can attach to a variety of types of helmet 108 (e.g., full face, motocross, open face, modular, off-road, bicycle, rollerblading, skateboarding, construction, etc.). While FIGS. 1B and 1C illustrate communicator 102 and helmet 108 as separate components, it can be appreciated that a helmet 108 could directly integrate the communicator 102 or components/technology thereof, whereby a helmet 108 can therefore possess the capabilities inherent to the communicator 102. It can also be appreciated that communicator 102 does not need to be installed on a helmet 108: communicator 102 could be worn by a user without a helmet 108 or otherwise attached.

Figure 1E:
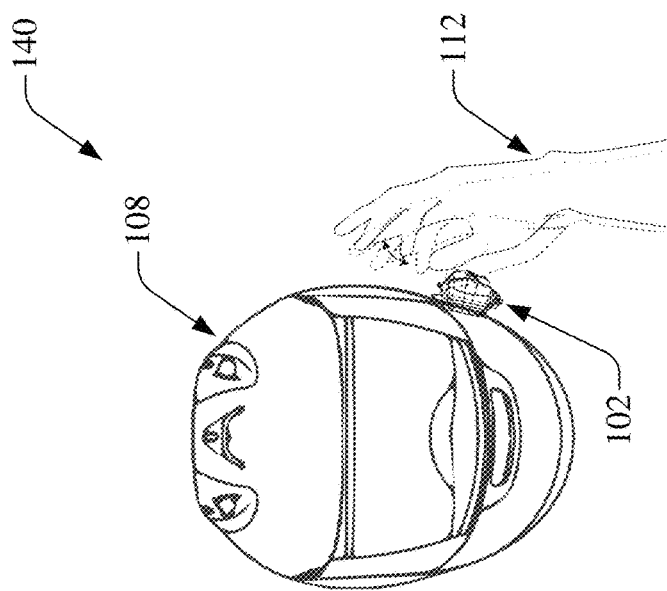
Figure 1D:
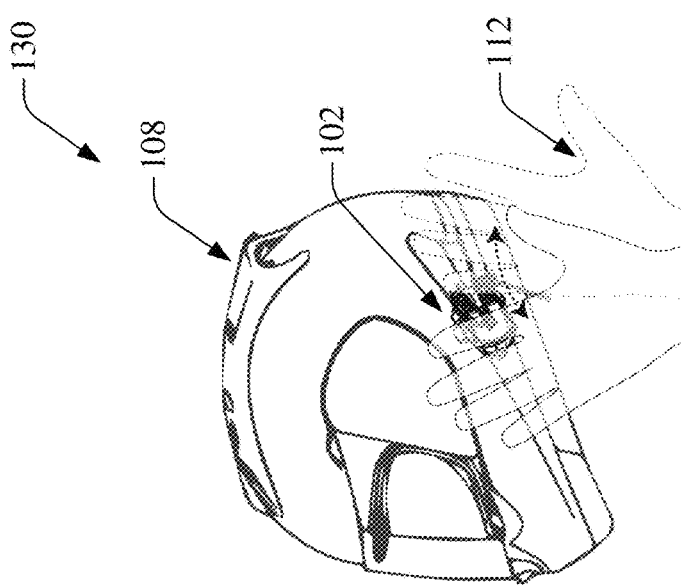

Turning now to FIGS. 1D and 1E, diagrams 130 and 140 are shown. Here, exemplary motions (e.g., gestures) by a hand 112 provide input for the communicator 102.

Figure 1F:
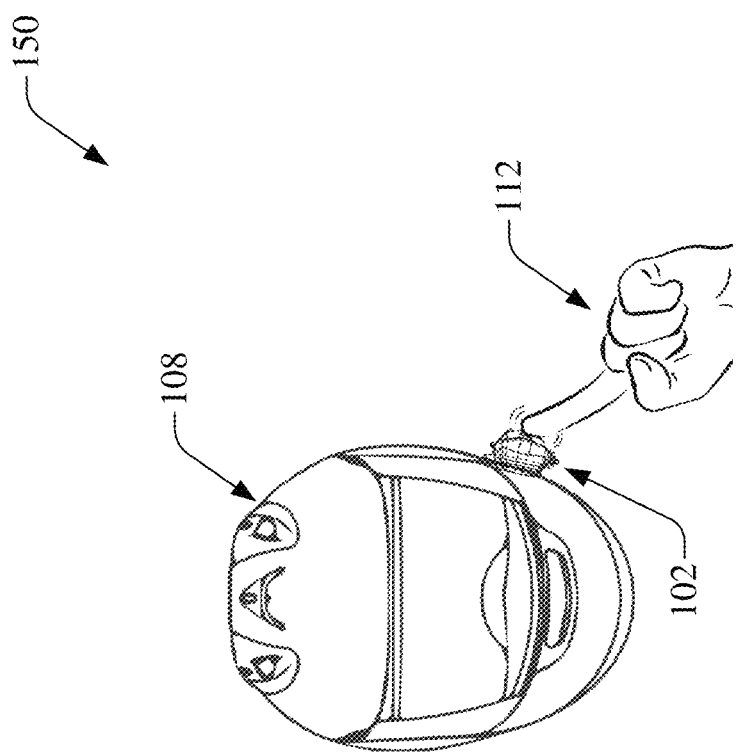

In FIG. 1F, diagram 150 depicts physical input to a communicator 102 from the hand 112. Physical input by the hand 112 can be received by communicator 102 at, for example, a button, screen, capacitive/resistive surface, wireless signal, etc.

Figure 1G:
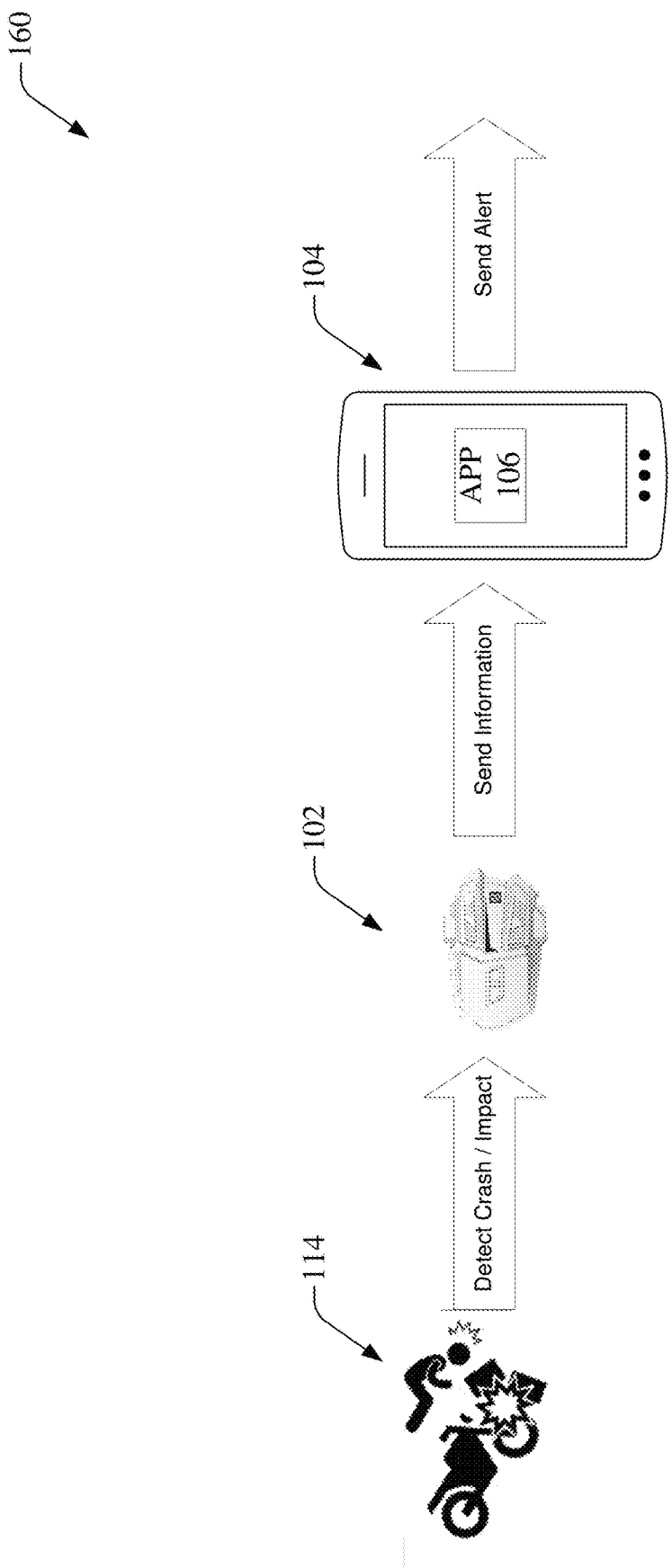

FIG. 1G, diagram 160, exemplifies a scenario in which an impact 114 occurs. Impact 114 can be, for example, a vehicular crash, fall by user, drop by user, or any other impact, collision, or condition that can be detected by the communicator 102. The communicator 102 can send information relating to the impact 114 to a mobile device 104 having an APP 106 installed thereon. The mobile device can thereby be enabled to send an alert.

Figure 2A:
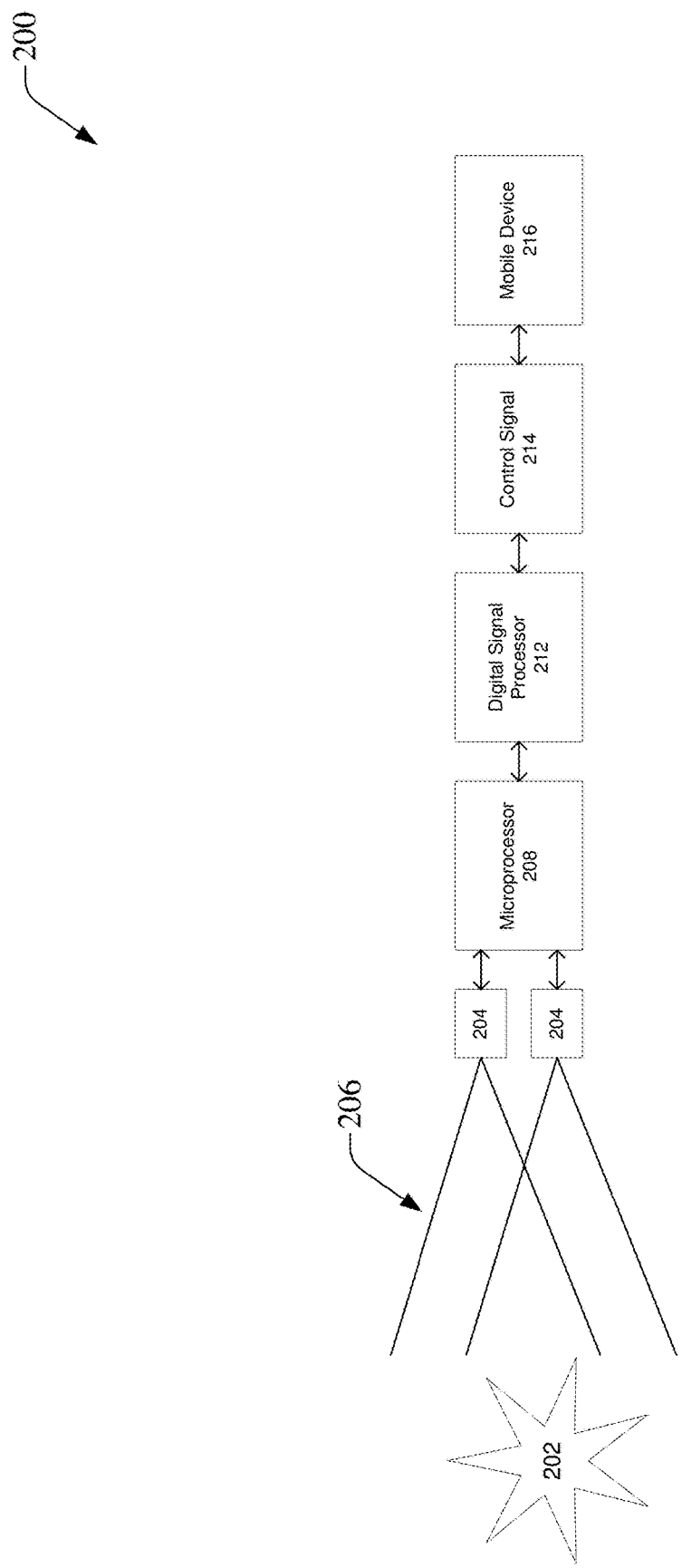
FIGS. 2A-2B are diagrams depicting systems, system components, processes, and methods relating to communication, entertainment, and safety in accordance with one or more embodiments described herein.
Figure 2B:
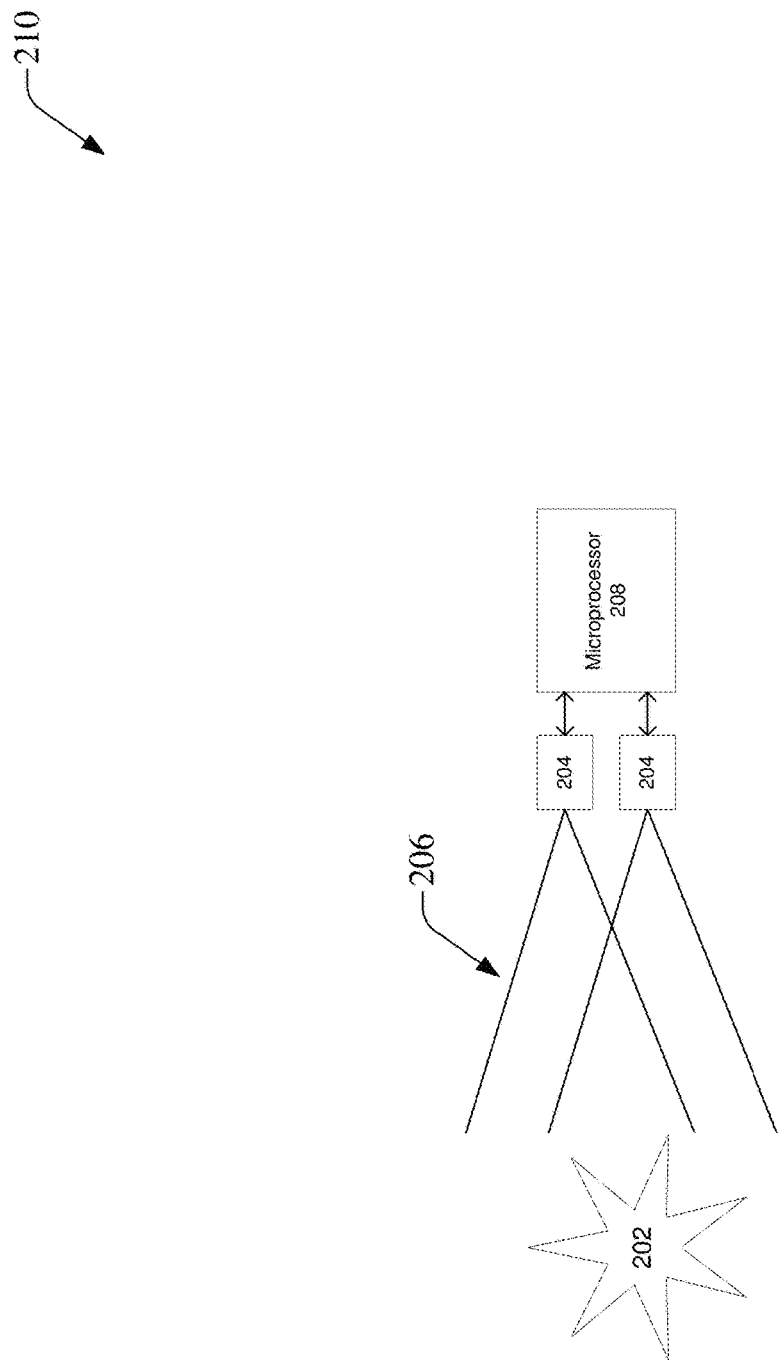

Referring now to FIGS. 2A and 2B, block diagrams 200 and 210 are depicted which show exemplary systems for gesture recognition and response.

Object 202 is detected by a sensor 204. Sensor 204 can be, for example, a proximity sensor. Object 202 can be, for example, a hand. Object can alternatively be an object designed configured for use with the system 200. For example, object 202 can comprise a trackable ring or glove. One or a plurality of sensors 204 can be utilized. Sensor 204 can comprise, for example, a laser, optical sensor, or other component that can be implemented to detect the distance of an object 202. In the case of a laser, sensor 204 can generate a beam 206 in order to quickly and reliably measure the distance of object 202 from the sensor 204 or a component or device to which the sensor 204 is attached.

Microprocessor 208 can be communicatively coupled to the sensor 204. The microprocessor 208 can receive a signal from the sensor 204. Microprocessor 208 interpret signals from proximity sensor 204 and detect whether a gesture was performed by the object 202.

Digital signal processor 212 can be communicatively coupled to the microprocessor 208. Alternatively, microprocessor 208 and digital signal processor 212 can be functional components of a single processor. Once the microprocessor 208 has detected a gesture, the digital signal processor 212 can identify and classify the gesture. After the gesture has been identified or classified, a control signal 214 can be output corresponding to the identified or classified gesture. The control signal 214 can be received by a mobile device 216 in order to operate functions at the mobile device 216 or different device, such as a communicator device.

Turning now to FIGS. 3A-3I, charts depicting exemplary scenarios in which exemplary gesture parameters are satisfied or not satisfied based upon distance detection are shown.

Figure 3A:
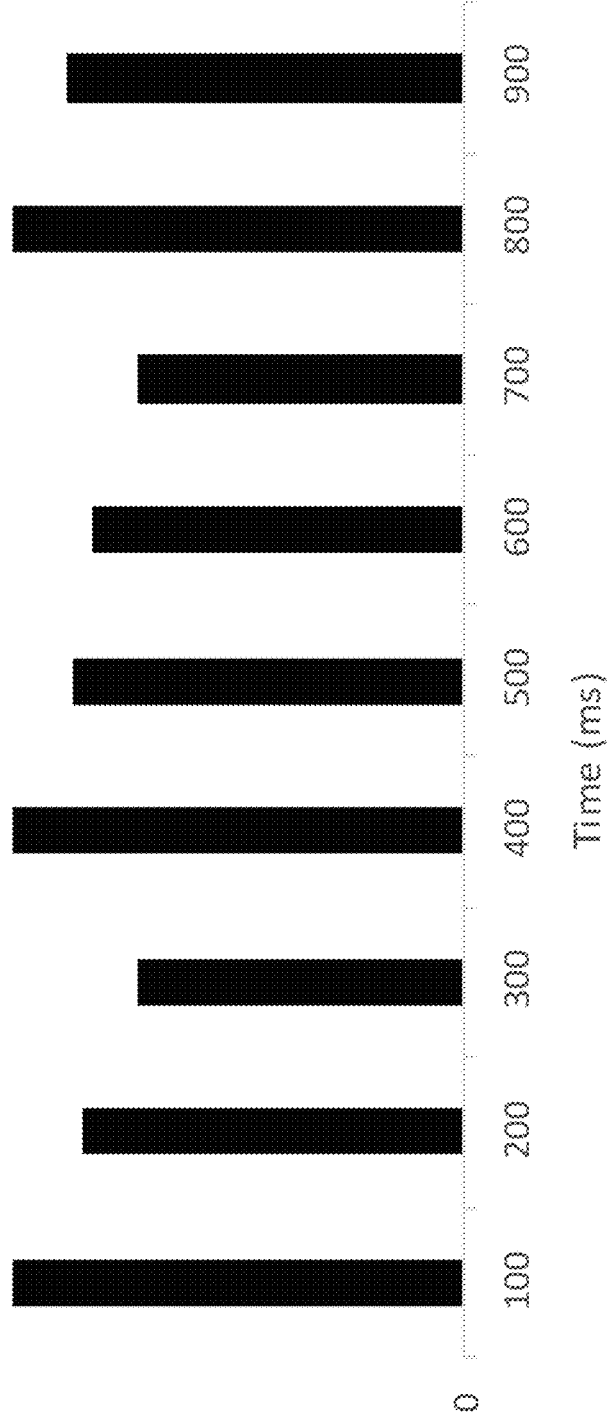
FIGS. 3A-3I are exemplary scenarios in which exemplary parameters are satisfied or not satisfied based upon distance detection in accordance with one or more embodiments described herein.

Chart 300 of FIG. 3A represents a sample output from a proximity sensor. It can be appreciated that throughout the entire exemplary time 0-900 ms, distance detected does not exceed 300 mm. According to an embodiment, 300 mm can be a distance limit and detection of an object within 300 mm (30 cm) from the proximity sensor would be considered for a possible gesture, depending on the distance of the object from the sensor or communicator over time. For example, an object greater than 300 mm away from the sensor may be ignored for the purposes of detection, identifying, or classification of a gesture. In this example, distances greater than 300 mm can be shown as 0 mm, or nonexistent, for the purposes of illustration. This way, an object outside of the distance limit can be treated like an object not detected at all. Other embodiments record all distances of detectable objects. Additional embodiments can have distance limits greater than 300 mm or smaller than 300 mm and therefore can have gestures that can be detected, identified, or classified at other distances. Distances are typically read at regular intervals. Typical intervals range from 20 ms to 100 ms, however, the frequency of reading, or refreshing, or the sensor can be at intervals less 20 ms or greater than 100 ms or can be at irregular intervals. Various examples of distance and timing information corresponding to various nonlimiting exemplary gestures are discussed herein.

Figure 3B:
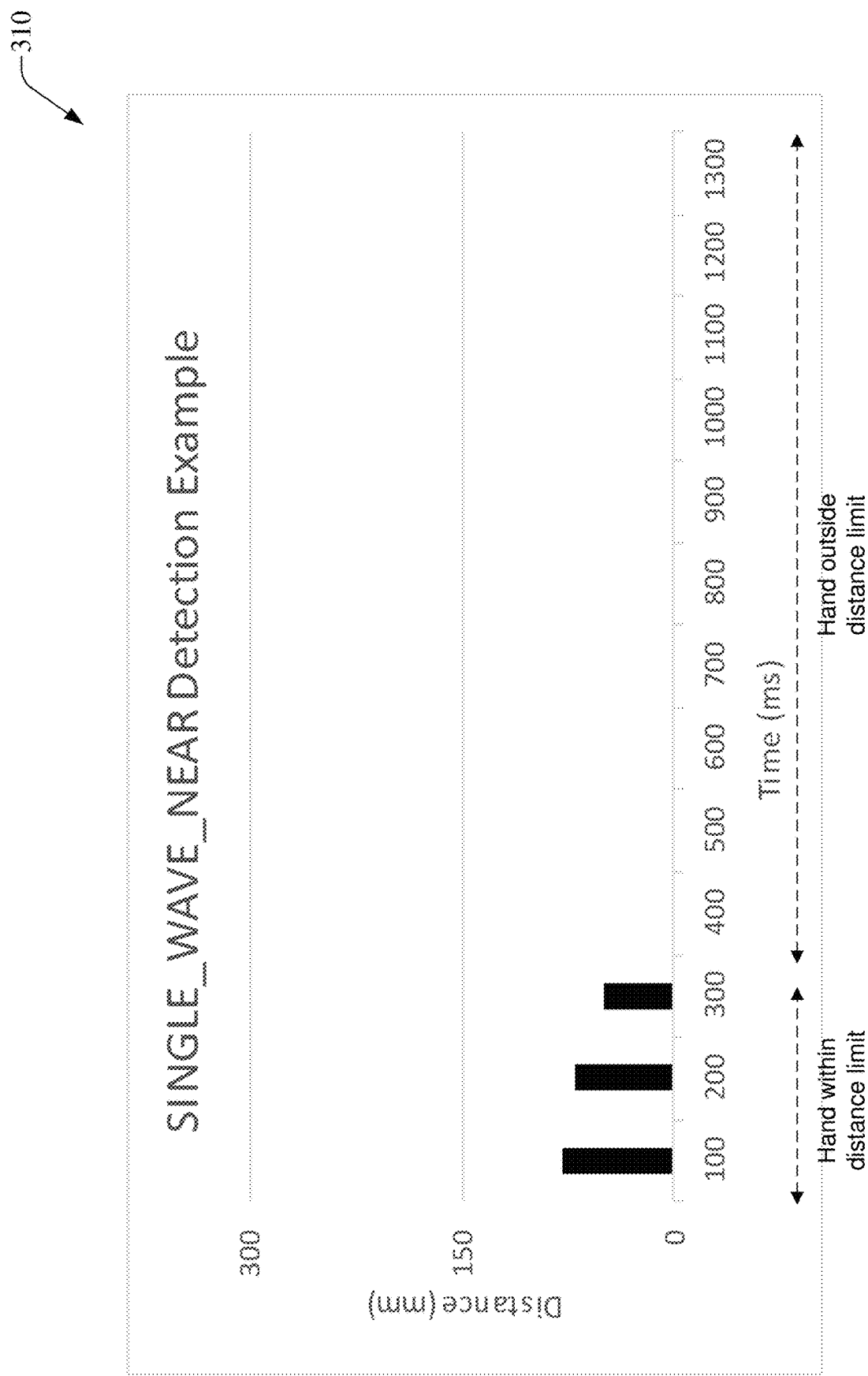

Chart 310 of FIG. 3B represents an exemplary detection representative of a gesture. According to an embodiment, if an object moves within a distance limit (e.g., 300 mm), stays for less than 1 second (e.g., 300 ms), then moves outside of the distance limit for about 1 second and the corresponding average distance reading within the distance limit is less than about 150 mm, then this is a gesture recognized as "Single Wave Near". While 150 mm is a threshold in this embodiment, other embodiments can use other threshold values. Single Wave Near can be representative of an object moving into then outside of a specified range once, nearby a communicator (e.g., within a distance limit).

Figure 3C:
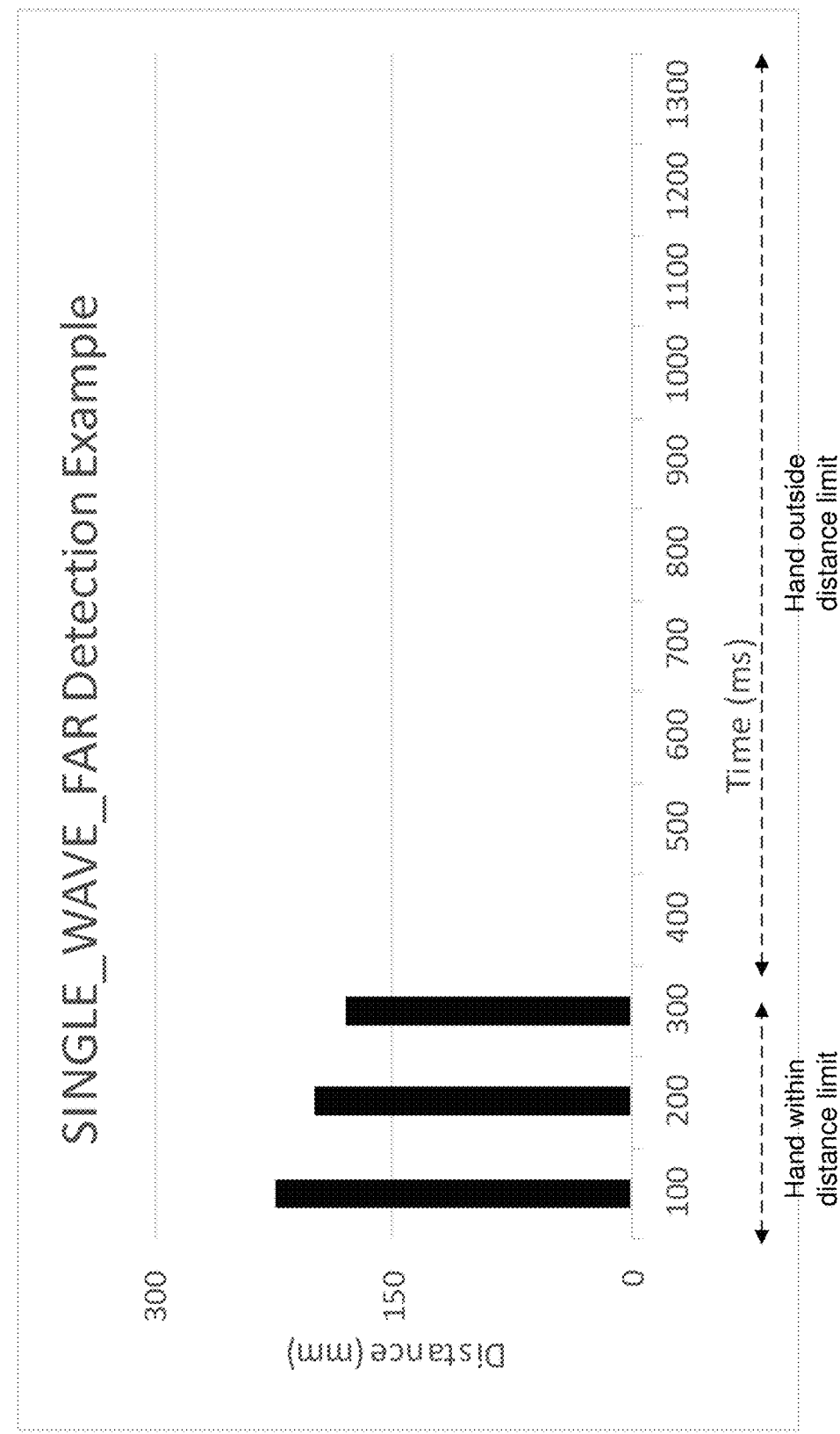

Chart 320 of FIG. 3C represents an exemplary detection representative of a gesture. According to an embodiment, if an object moves within a distance limit, stays for less than 1 second, then moves outside of the distance limit for about 1 second and the corresponding average distance reading within the distance limit is greater than about 150 mm, then this is a gesture recognized as "Single Wave Far". While 150 mm is a threshold in this embodiment, other embodiments can use other threshold values. Single Wave Far can be representative of an object moving into then outside of a specified range once, far from a communicator.

Figure 3D:
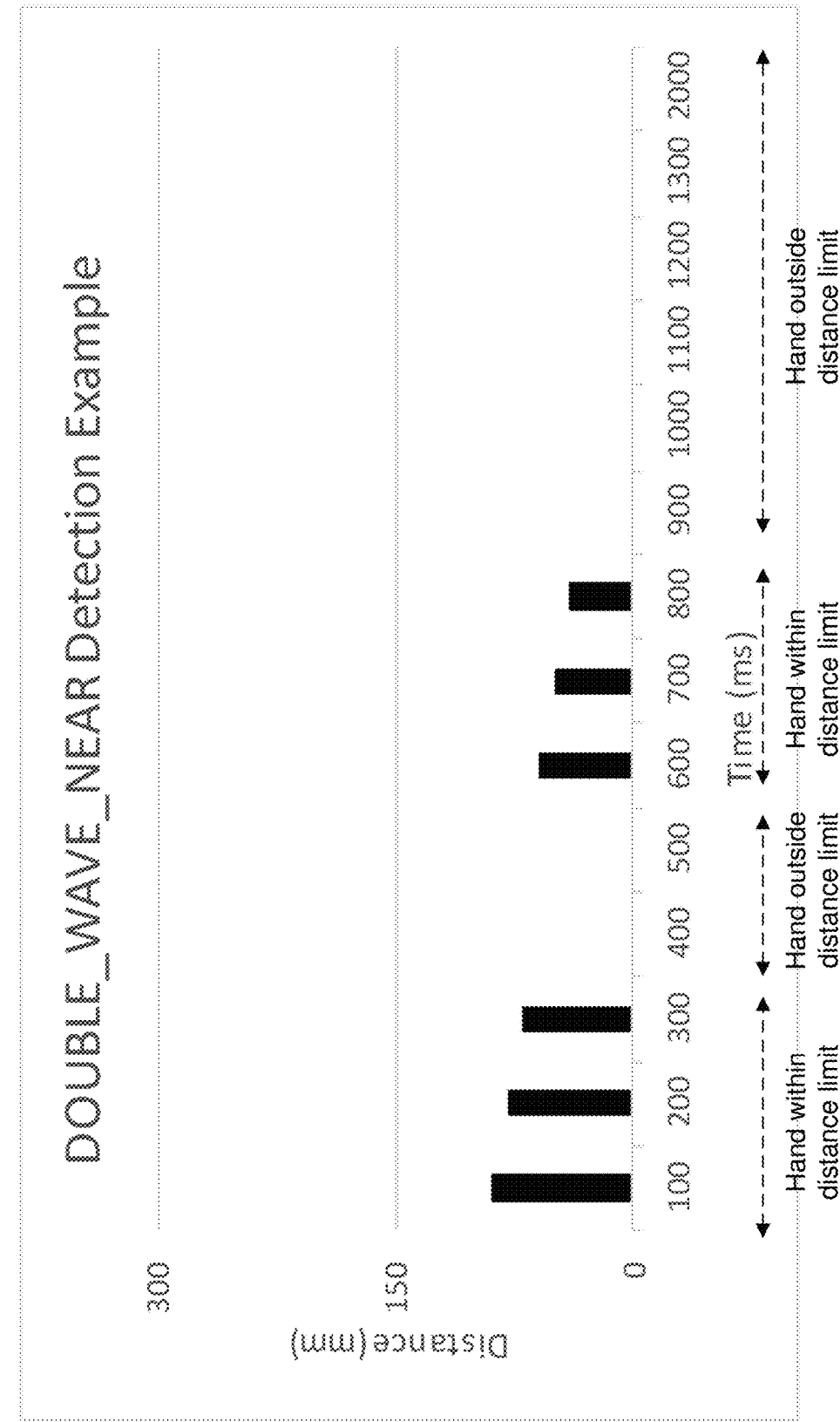

Chart 330 of FIG. 3D represents an exemplary detection representative of a gesture. According to an embodiment, if, within a distance limit, an object moves within and then outside of a threshold twice within two seconds, and if the time interval from when the hand moves out of the threshold to back within is between about 0.2 seconds and 1 second (e.g., 300 ms in chart 330), and the average distance reading within the distance limit is less than 150 mm, then this is a gesture recognized as "Double Wave Near". While 150 mm is the threshold in this embodiment, other embodiments can use other threshold values. Double Wave Near can be representative of an object moving in and out of a specified range twice near to a communicator.

Figure 3E:
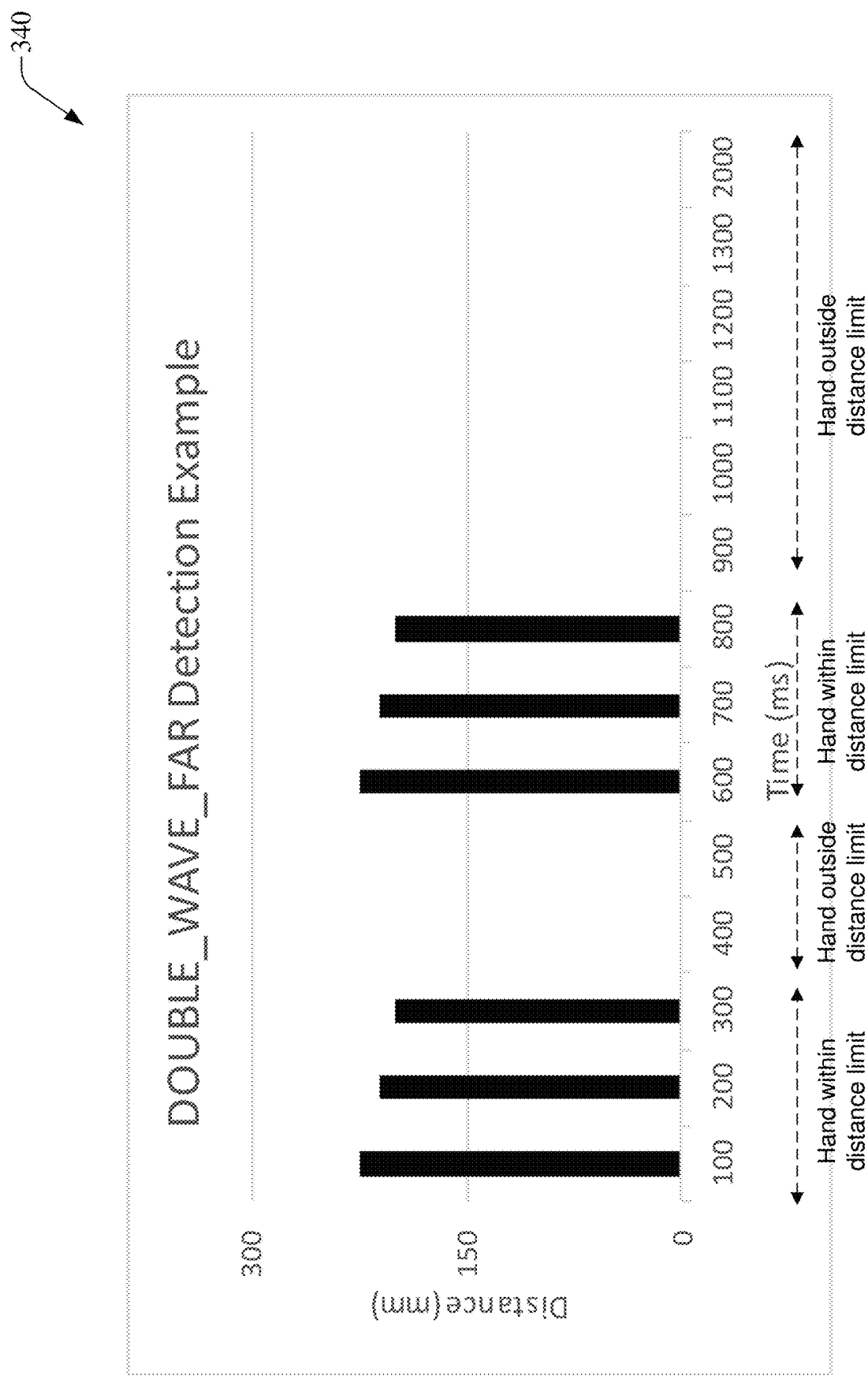

Chart 340 of FIG. 3E represents an exemplary detection representative of a gesture. According to an embodiment, if, within a distance limit, an object moves within and then outside of a threshold twice within two seconds, and if the time interval from when the object moves out of the threshold to back within is between about 0.2 seconds and 1 second, and the average distance reading within the beam is greater than 150 mm, then this is a gesture recognized as "Double Wave Far". While 150 mm is the threshold in this embodiment, other embodiments can use other threshold values. Double Wave Far can be representative of an object moving in and out of a specified range twice far from a communicator.

Figure 3F:
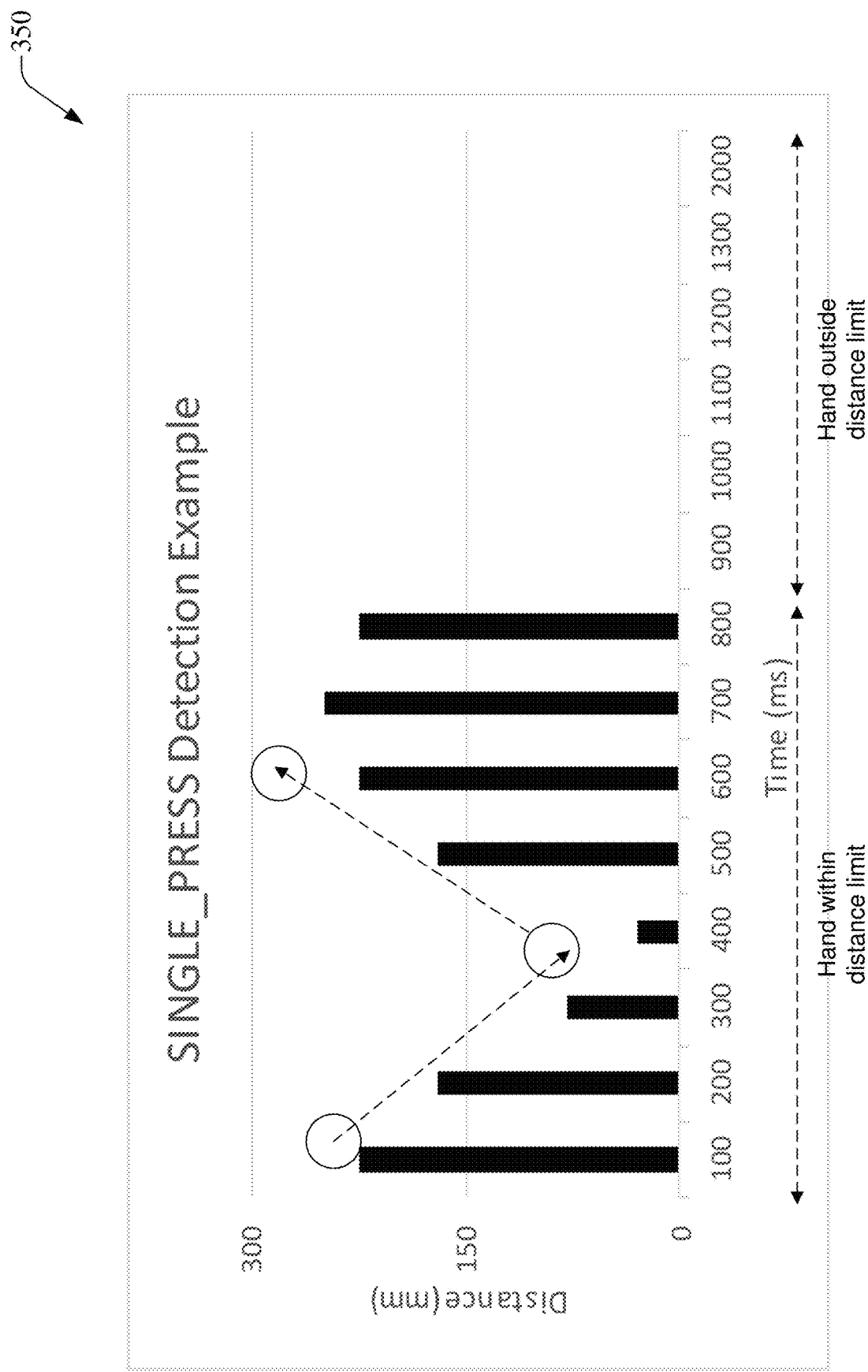

Chart 350 of FIG. 3F represents an exemplary detection representative of a gesture. According to an embodiment, if an object moves from far to near within a distance limit, then reverses direction and moves from near to far, and the travel distance is more than 50 mm in each direction, and the movement of the object is completed within 2 seconds, then this is a gesture recognized as "Single Press". While 50 mm and 2 seconds are threshold values in this embodiment, other embodiments can use other threshold values. Single Press can be representative of an object moving from far to near once within a distance limit with respect to a communicator. A method for identifying Single Press can include identification of turning points. A turning point can be determined by an identification of a change in gradient between 3 sample values, noted by circles on chart 350. When subtracting the distance of a turning point from a previous turning point, a negative value indicates an object moving away from the sensor. A positive value indicates an object moving towards the sensor. The absolute value of subtraction between two turning points is indicative of the distance traveled between those two turning points.

Figure 3G:
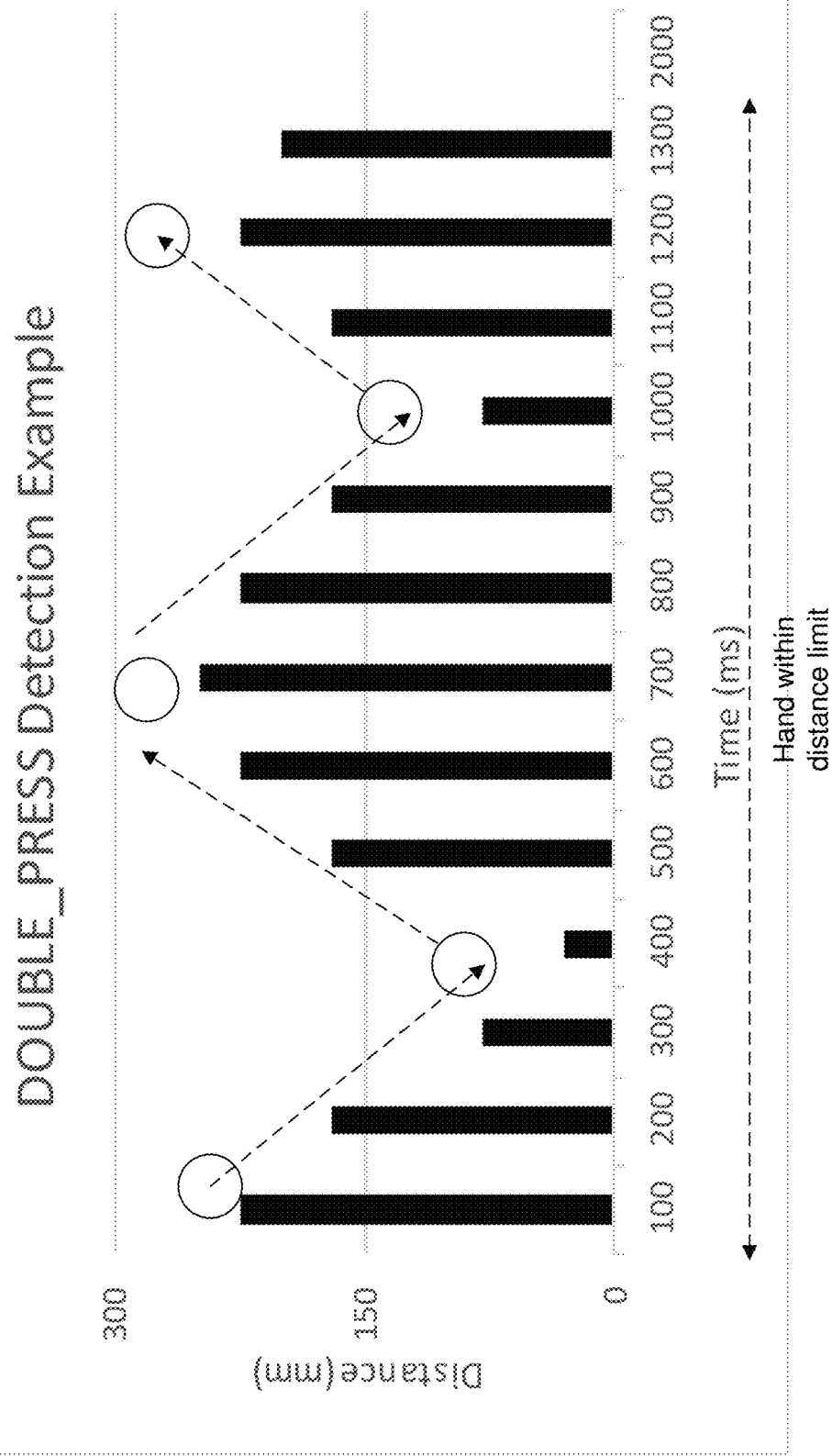

Chart 360 of FIG. 3G represents an exemplary detection representative of a gesture. According to an embodiment, if an object moves from far to near within a threshold, then reverses direction and moves from near to far, then moves from far to near again, then reverses direction and moves from near to far again, and the travel distance is more than 50 mm in each direction, then this is a gesture recognized as "Double Press". While 50 mm and 2 seconds are threshold values in this embodiment, other embodiments can use other threshold values. Double Press can be representative of an object moving from far to near twice within a distance limit with respect to a communicator. A method for identifying Double Press can include identification of turning points. 3 turning points can be identified in double press. A turning point can be determined by an identification of a change in gradient between 3 sample values, noted by circles on chart 360. When subtracting the distance of a turning point from a previous turning point, a negative value indicates an object moving away from the sensor. A positive value indicates an object moving towards the sensor. The absolute value of subtraction between two turning points is indicative of the distance traveled between those two turning points.

Figure 3H:
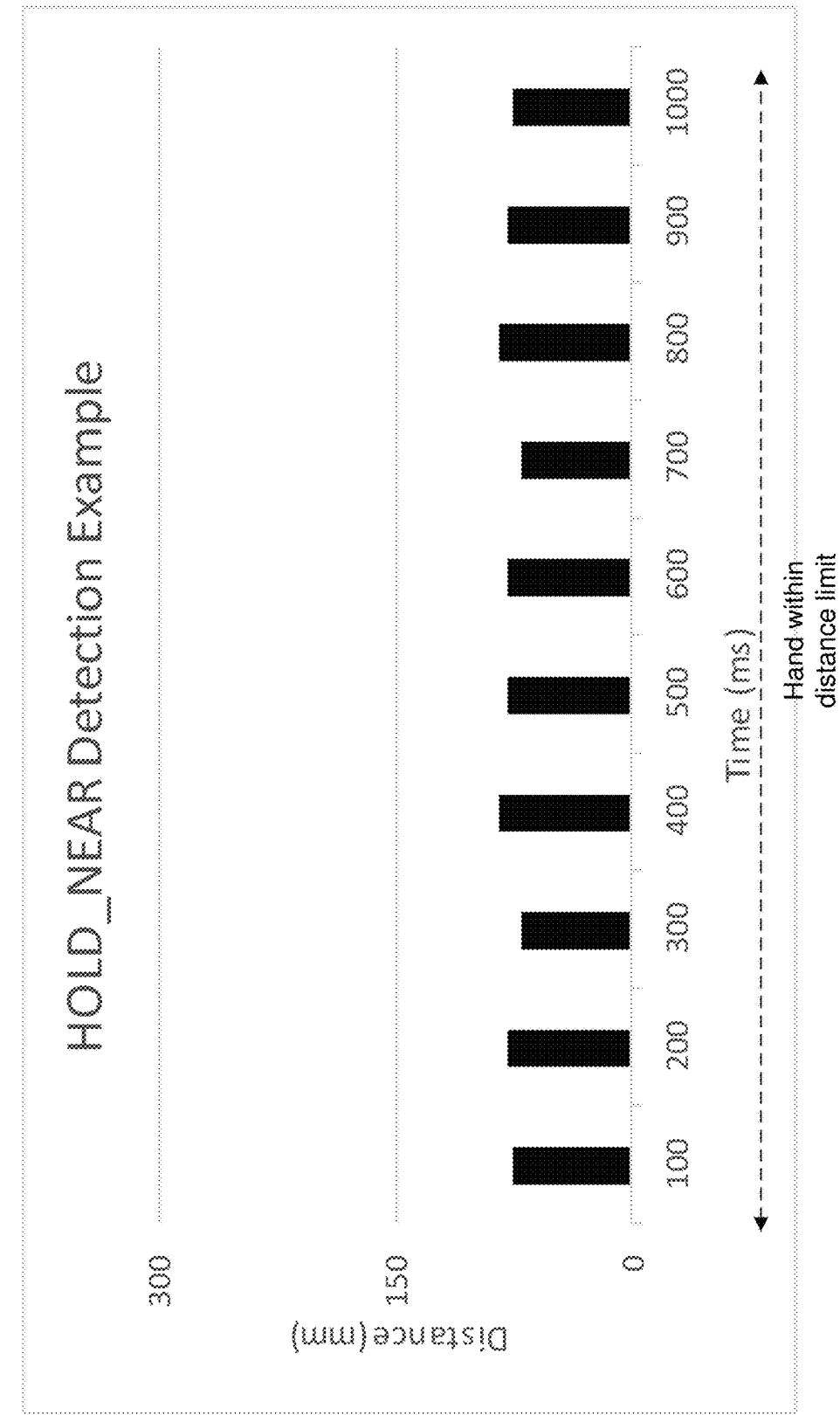

Chart 370 of FIG. 3H represents an exemplary detection representative of a gesture. According to an embodiment, if an object moves within the distance limit, stays for more than 1 second, and the average distance reading is less than 150 mm, and the difference between the maximum and minimum distance values is less than 50 mm, then this is a gesture recognized as "Hold Near". While 150 mm is the threshold and 50 mm is the max range in this embodiment, other embodiments can use other threshold or max range values. Hold Near can be representative of an object moving into and remaining near the proximity sensor of a communicator.

Figure 3I:
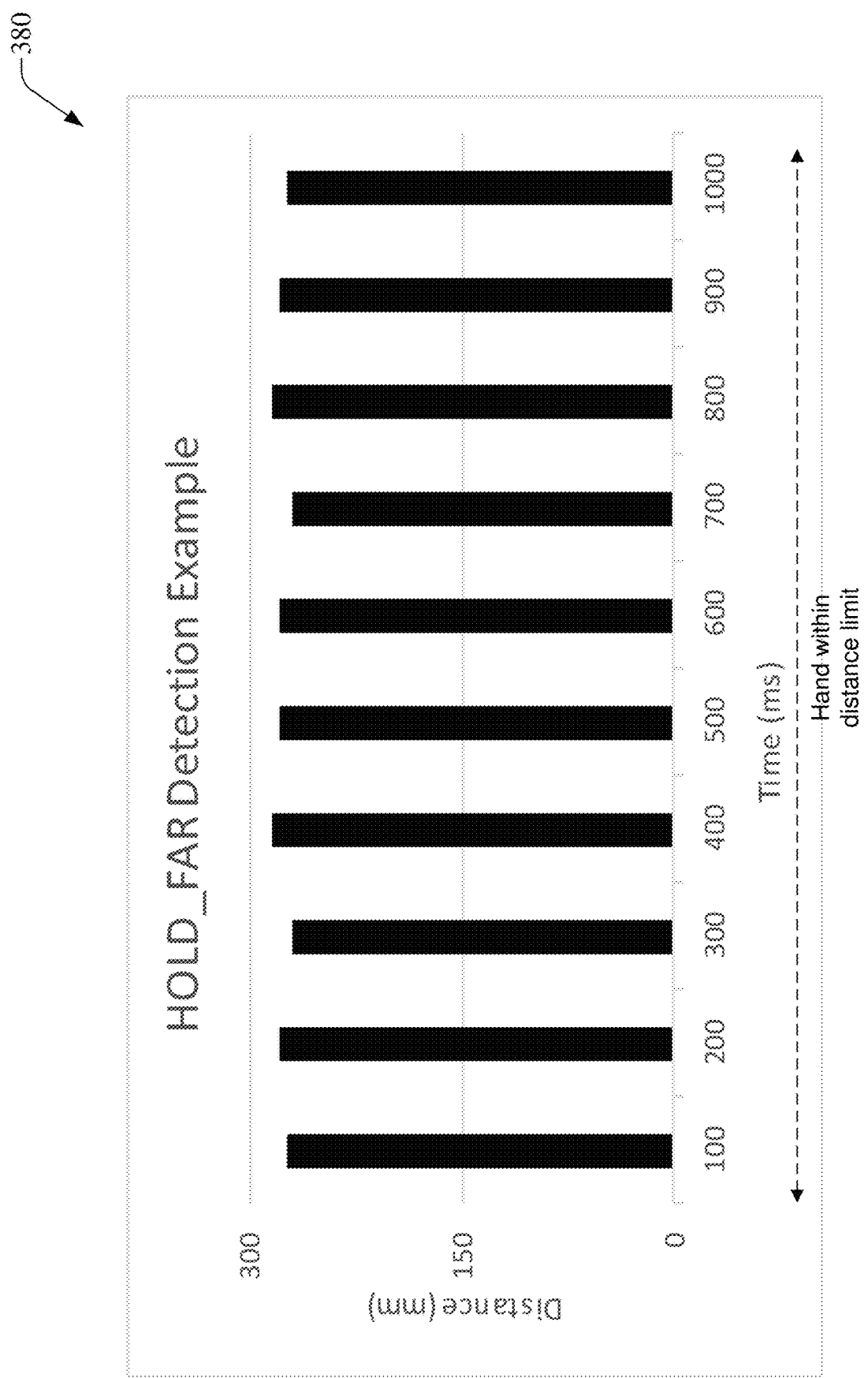

Chart 380 of FIG. 3I represents an exemplary detection representative of a gesture. According to an embodiment, if an object moves within the distance limit, stays for more than 1 second, and the average distance reading is greater than 150 mm, and the difference between the maximum and minimum distance values is less than 50 mm, then this is a gesture recognized as "Hold Far". While 150 mm is the threshold average and 50 mm is the max range in this embodiment, other embodiments can use other threshold or max range values. Hold Far can be representative of an object moving into and remaining far from the proximity sensor of a communicator.

Turning now to FIGS. 4A-4E, charts depicting exemplary scenarios in which exemplary parameters are satisfied or not satisfied based upon signal amplitude are shown.

Figure 4A:
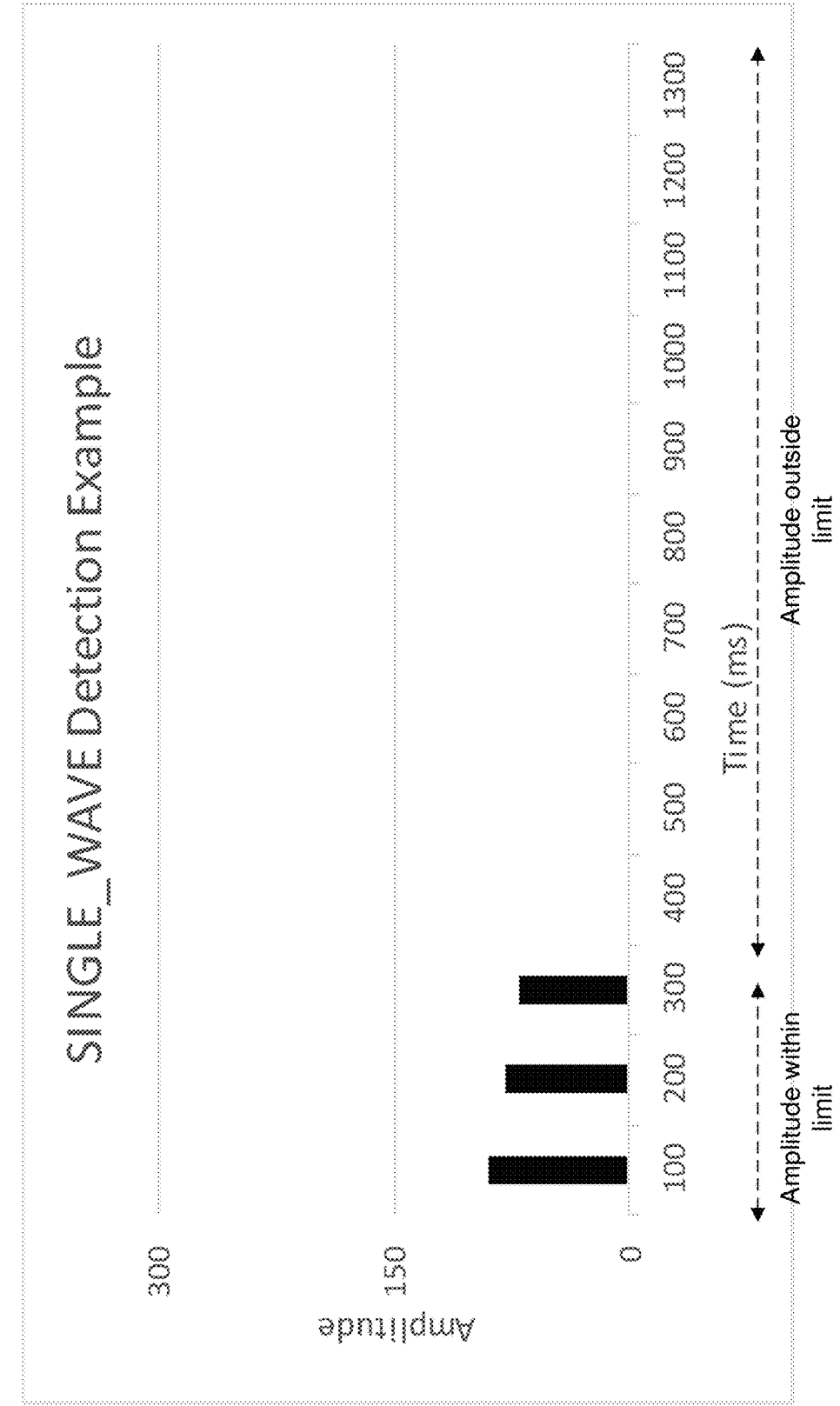
FIGS. 4A-4E are exemplary scenarios in which exemplary parameters are satisfied or not satisfied based upon signal amplitude in accordance with one or more embodiments described herein.

Chart 400 of FIG. 4A represents an exemplary detection representative of a gesture. According to an embodiment, while below an amplitude limit, if an amplitude is within a threshold and stays within the threshold for less than 1 second, then exceeds the threshold for about 1 second and the corresponding average amplitude reading within a range, then this is a gesture recognized as "Single Wave".

Figure 4B:
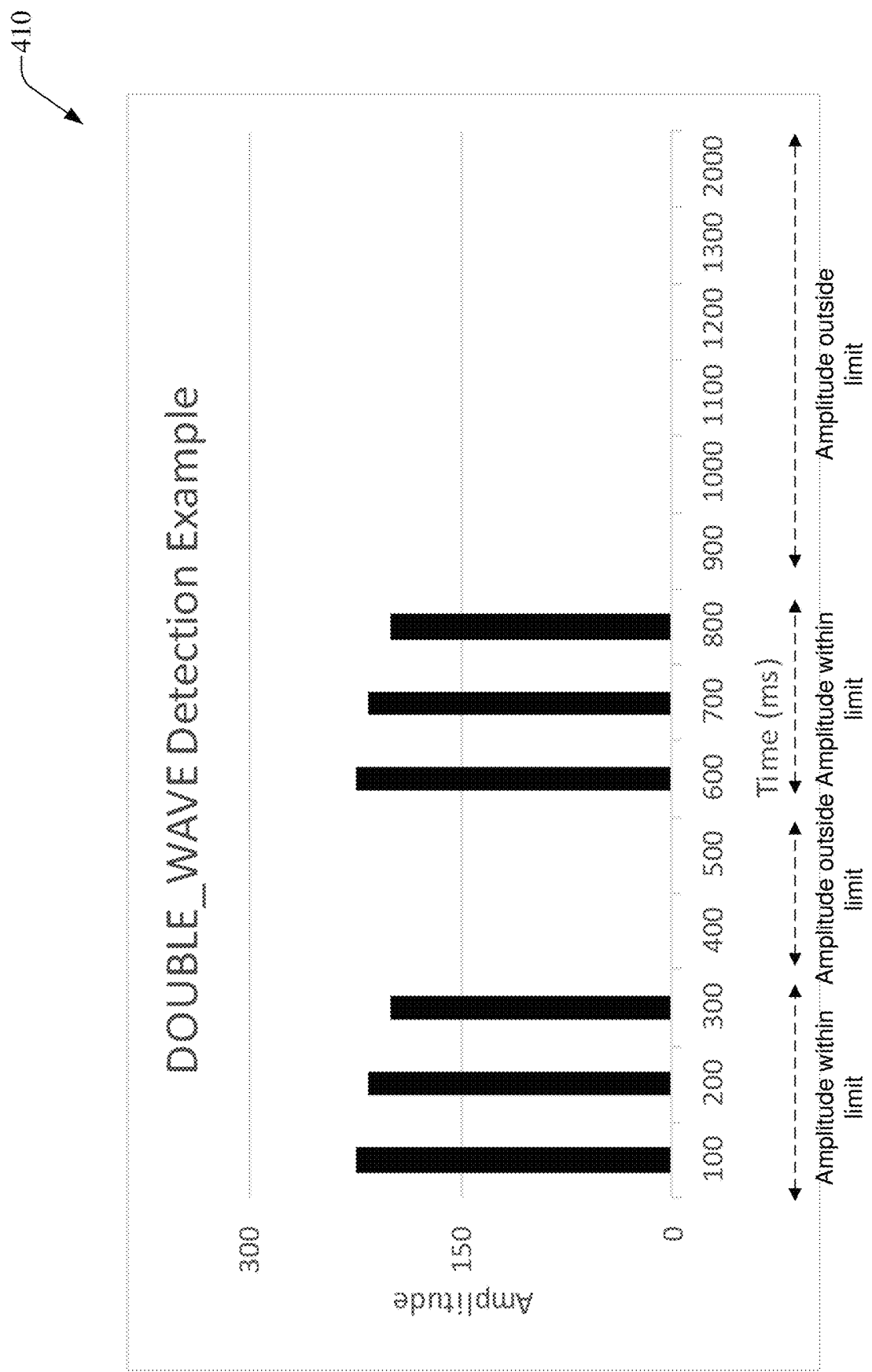

Chart 410 of FIG. 4B represents an exemplary detection representative of a gesture. According to an embodiment, while below an amplitude limit, if an amplitude is within a threshold twice within 2 seconds, and if the time interval from when the amplitude falls below the threshold and surpasses it again is between about 0.2 seconds and 1 second, and the corresponding average amplitude is within a range, then this is a gesture recognized as "Double Wave".

Figure 4C:
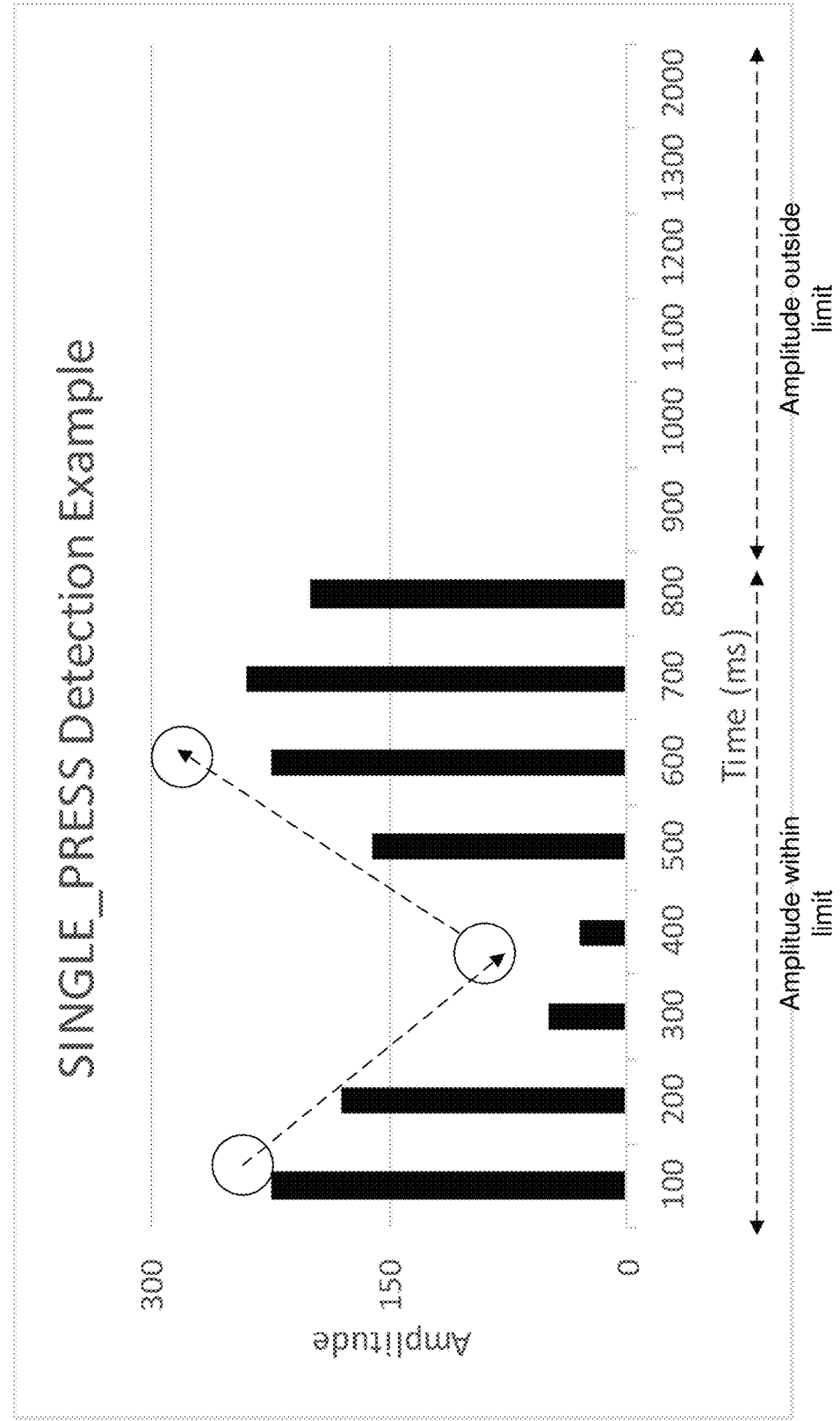

Chart 420 of FIG. 4C represents an exemplary detection representative of a gesture. According to an embodiment, if while below an amplitude limit, an amplitude decreases, then increases, and the difference between the minimum and both maximum amplitudes are each more than a threshold, and the foregoing is completed within 2 seconds, then this is a gesture recognized as "Single Press". Single Press can be representative of an object moving from far to near once with respect to a communicator. A method for identifying Single Press can include identification of turning points. A turning point can be determined by an identification of a change in gradient between 3 sample values, noted by circles on chart 420.

Figure 4D:
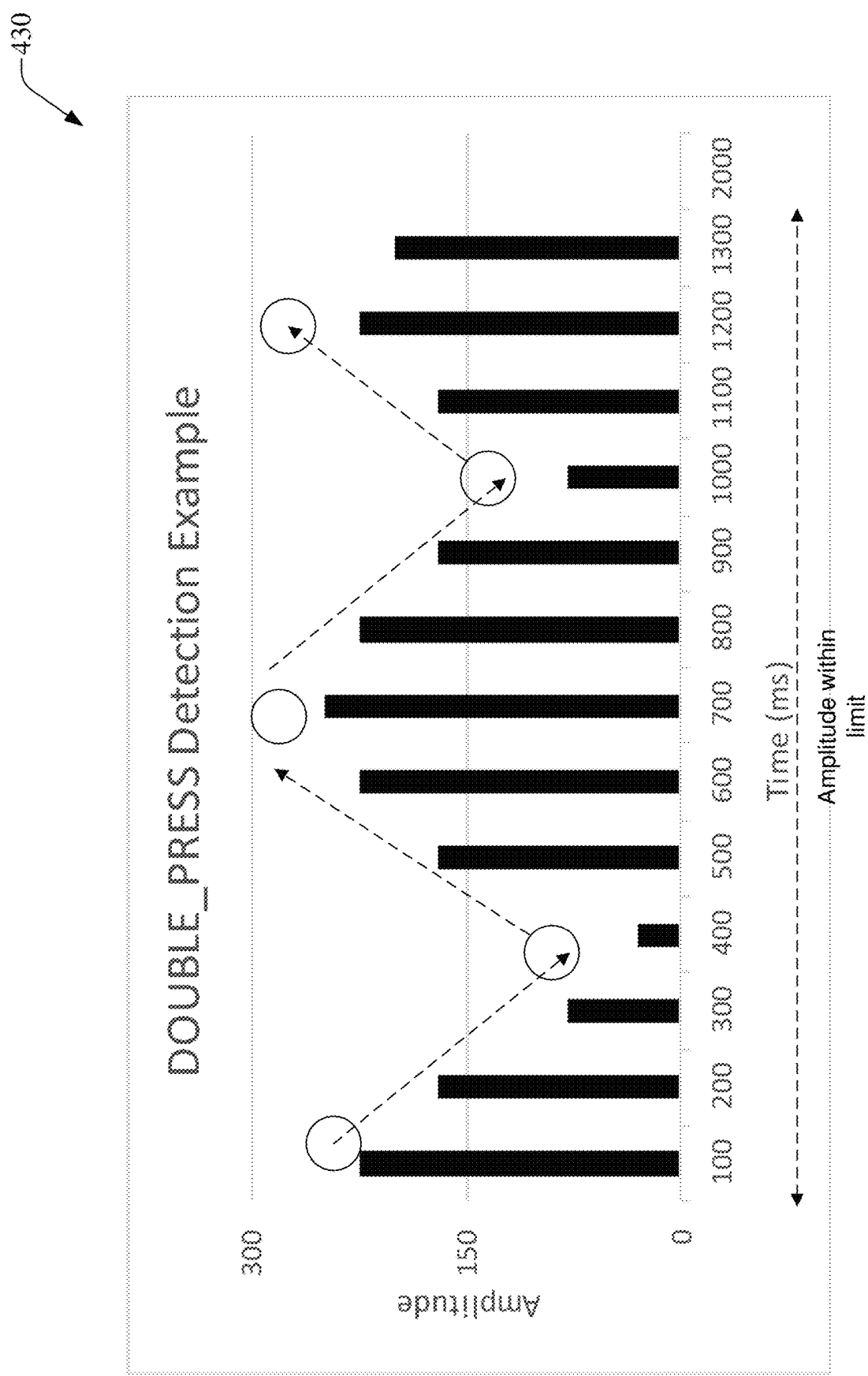

Chart 430 of FIG. 4D represents an exemplary detection representative of a gesture. According to an embodiment, if while below an amplitude limit, an amplitude decreases, then increases, representing a change in direction of an object (e.g., a hand), then the amplitude decreases again, then increases again, and the difference between both amplitude minimums their respective adjacent maximums are more than a threshold, then this is a gesture recognized as "Double Press". Double Press can be representative of an object moving from far to near twice with respect to a communicator. A method for identifying Double Press can include identification of turning points. A turning point can be determined by an identification of a change in gradient between 3 sample values, noted by circles on chart 430. Double Press can comprise 3 turning points.

Figure 4E:
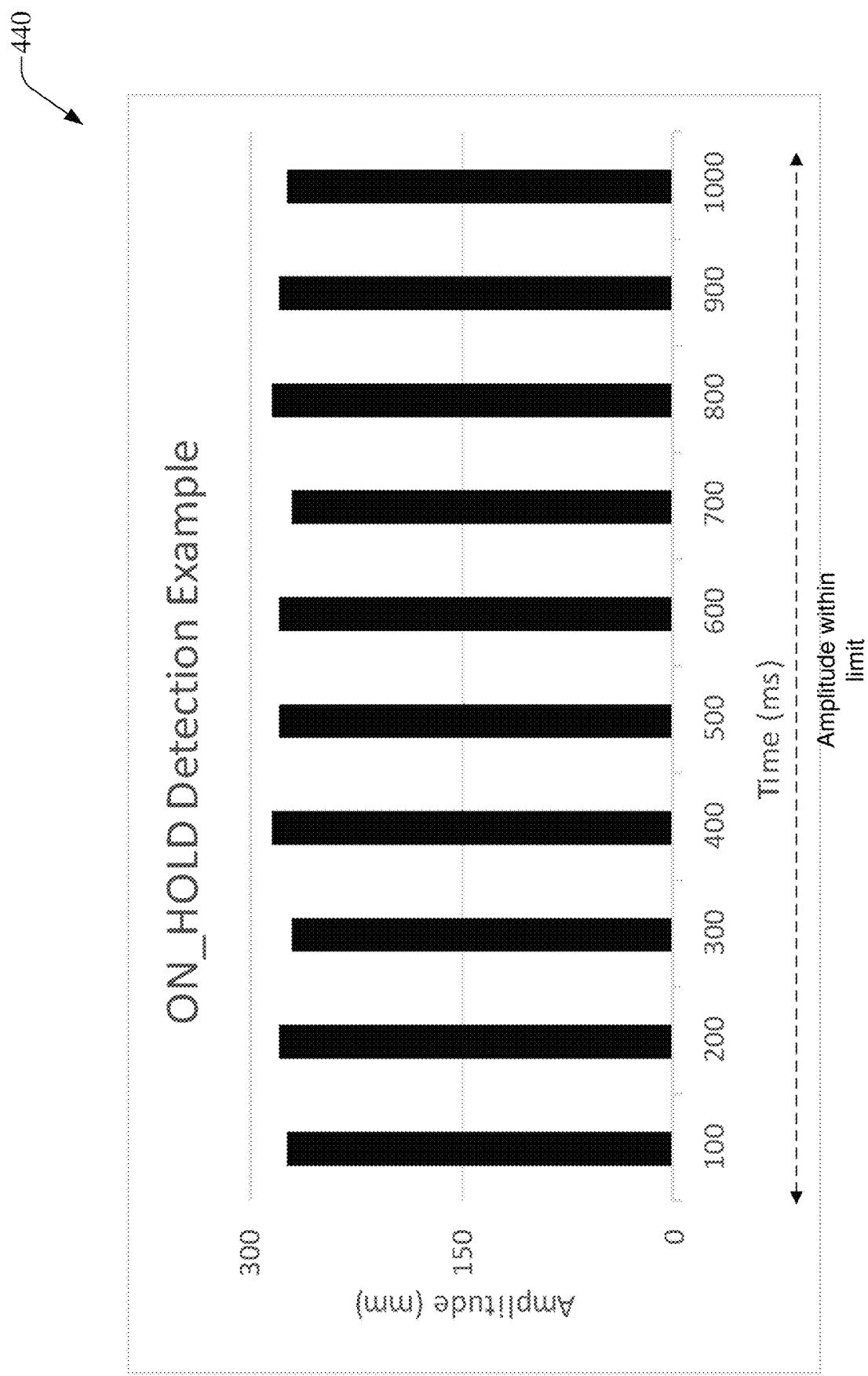

Chart 440 of FIG. 4E represents an exemplary detection representative of a gesture. According to an embodiment, if while below an amplitude limit, an amplitude surpasses a first threshold and remains between the first threshold and amplitude limit for more than 1 second, the average amplitude during the foregoing is greater than a second threshold value, and the difference between the minimum and maximum amplitudes during the foregoing is within a range (e.g., amplitude difference corresponding to difference of 50 mm or less), then this is a gesture recognized as "On Hold". On Hold can be representative of an object moving into and remaining far from a communicator.

According to an article published in the U.S. National Library of Medicine National Institutes of Health Journal of Medical and Biological Engineering, "HIC is one of the most common and reliable criterion to assess [traumatic brain injury] severity" Ievgen Levadnyi et al., *Finite Element Analysis of Impact for Helmeted and Non-helmeted Head*, 38 Journal of Medical and Biological Engineering 587-595 (2018), https://www.ncbi.nlm.nih.gov/pmc/articles/PMC6061106/(last visited May 23, 2019). It follows that 49 C.F.R. § 571.208 provides safety requirements for passenger cars, multipurpose passenger vehicles, trucks, and buses. It requires that a maximum calculated $HIC^{36}$ (HIC for any two points in time, $t_1$ and $t_2$, during the event which are separated by not more than a 36 millisecond time interval and where $t_1$ is less than $t_2$) shall not exceed a value of 1,000. It also requires that a maximum calculated $HIC^{15}$ (HIC for any two points in time, $t_1$ and $t_2$, during the event which are separated by not more than a 15 millisecond time interval and where $t_1$ is less than $t_2$) shall not exceed a value of 700. These standards can aid in determining the severity of an impact detected by a helmet communicator. Eq. (1) below is a formula for calculating maximum HIC:

$$HIC = \max_{t_1, t_2} \left\{ (t_2 - t_1) \left[ \frac{1}{(t_2 - t_1)} \int_{t_1}^{t_2} a(t)dt \right]^{2.5} \right\} \quad \text{Eq. (1)}$$

Figure 5A:
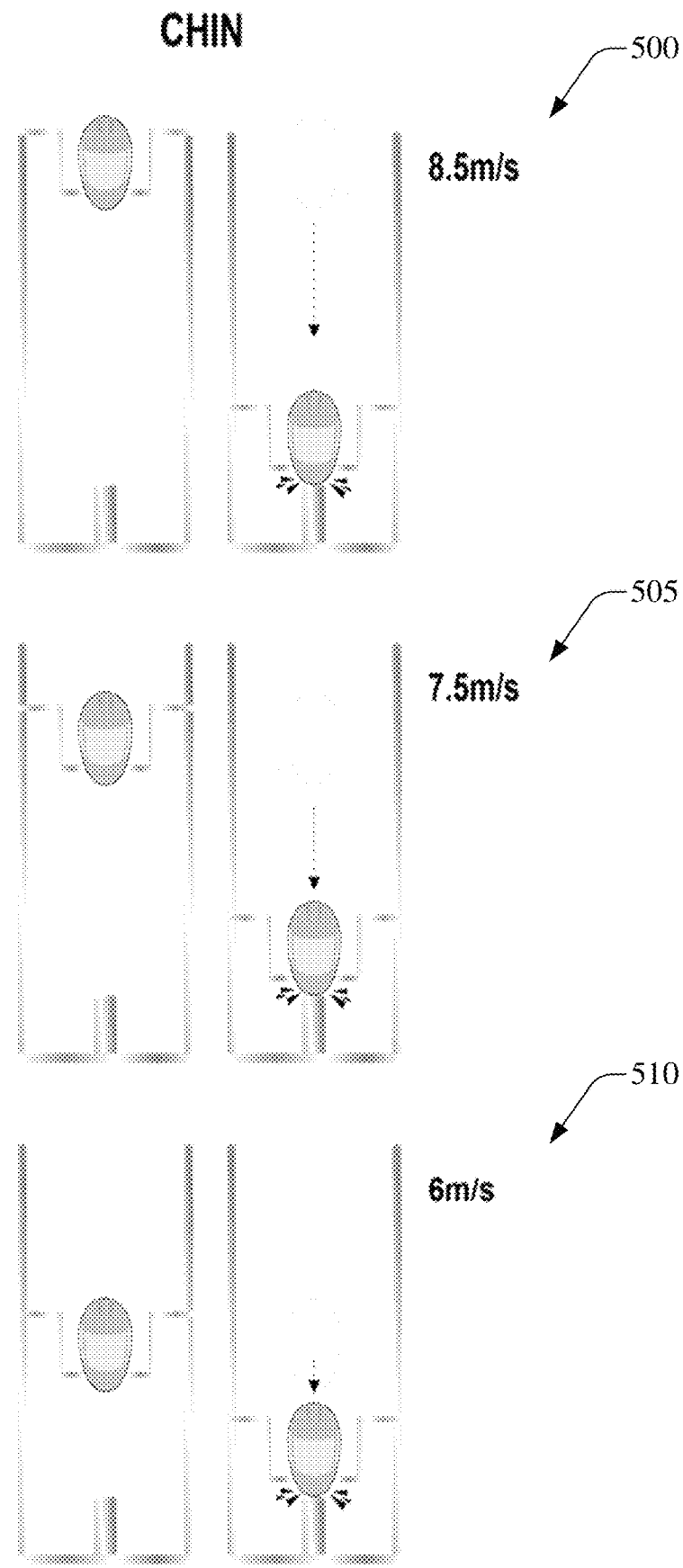
FIGS. 5A-5D are diagrams depicting various impact scenarios in accordance with one or more embodiments described herein.
Figure 5B:
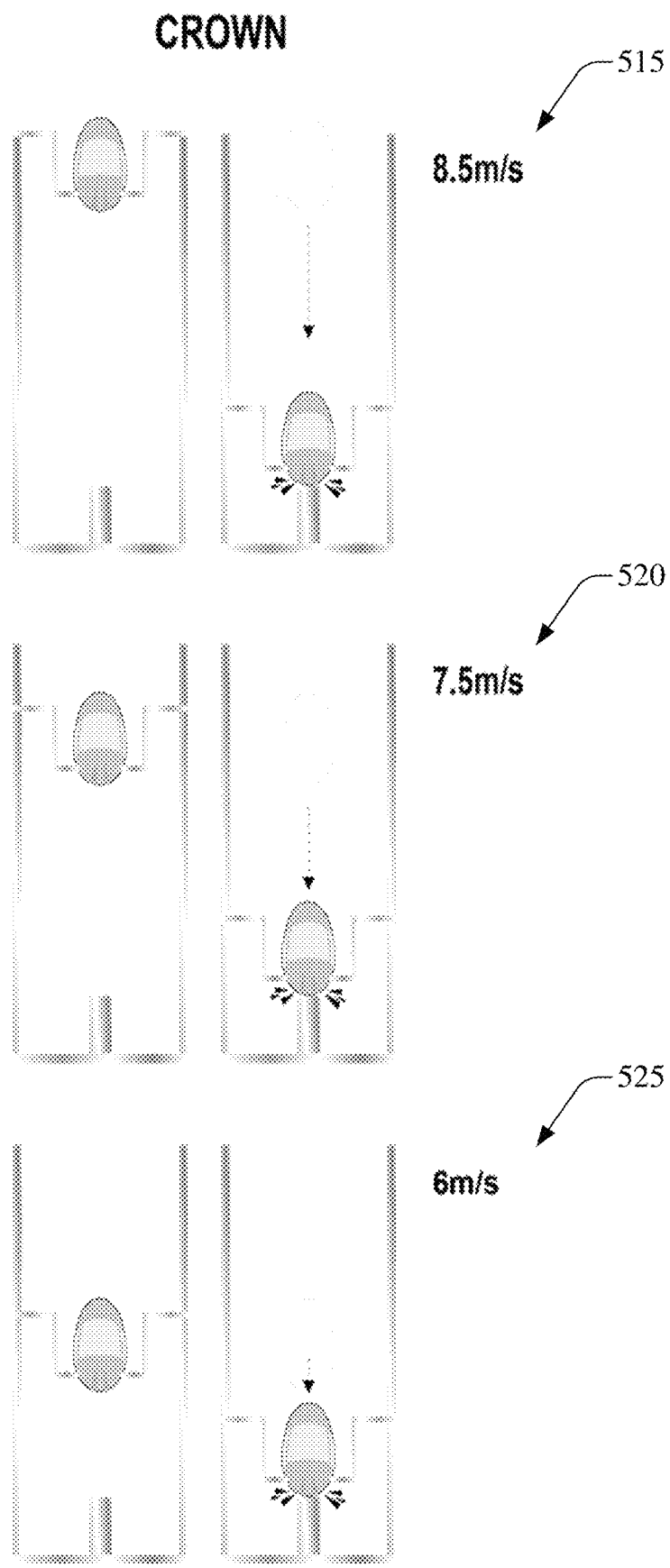
Figure 5C:
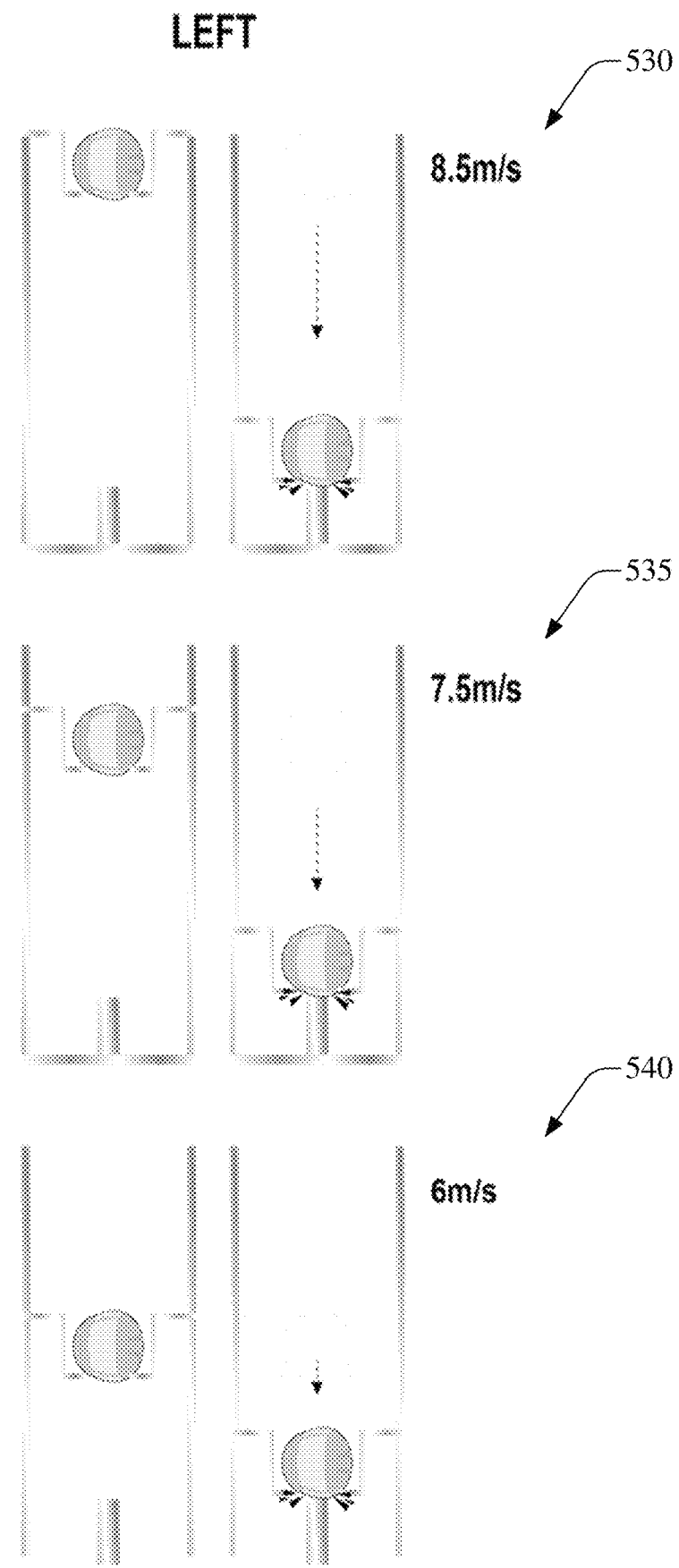
Figure 5D:
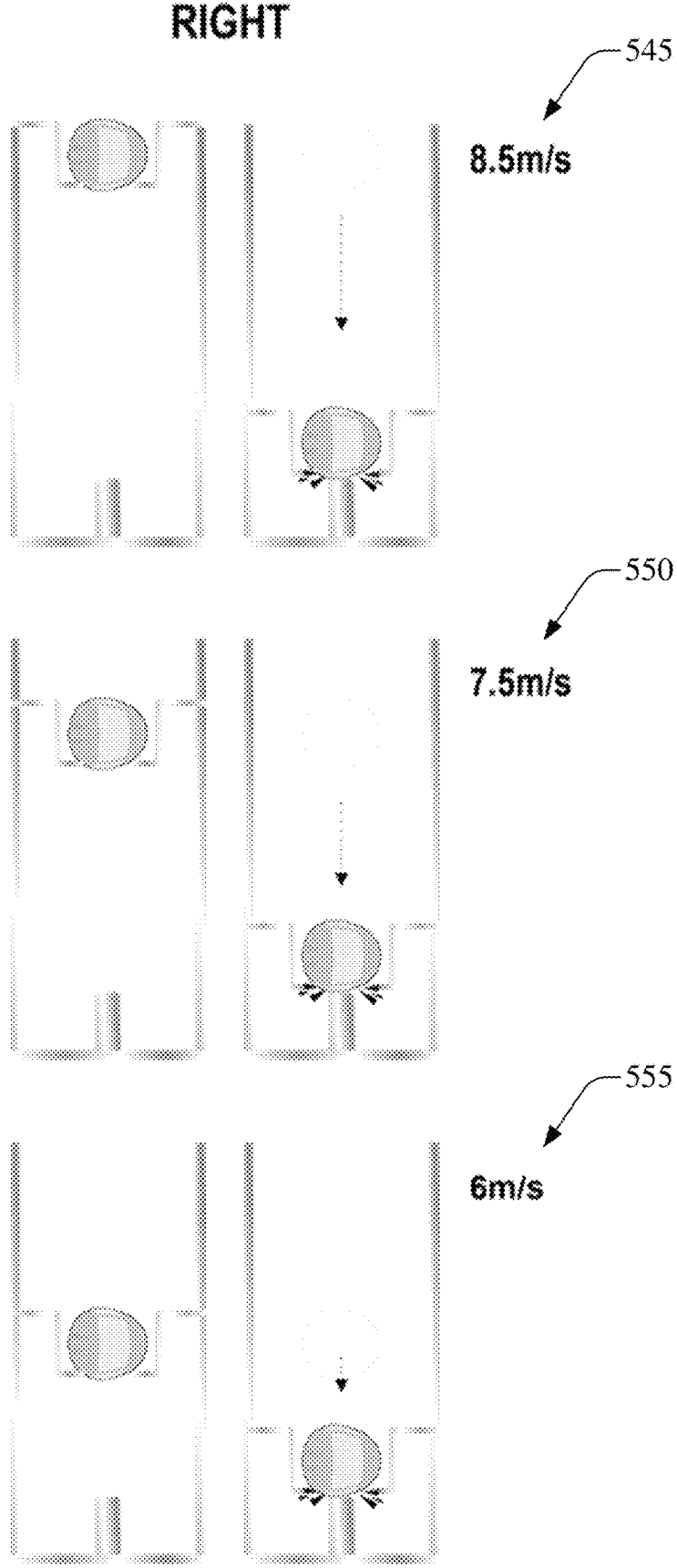

With reference now to FIGS. 5A-5D, exemplary impact zones are shown. Various speeds, heights, accelerations, etc. of an impact can be tested and compared with the foregoing HIC information. FIG. 5A and diagrams 500, 505, and 510 illustrate an impact to a chin zone at various speeds. FIG. 5B and diagrams 515, 520, and 525 illustrate an impact to a crown zone at various speeds. FIG. 5C and diagrams 530, 535, and 540 illustrate an impact to a left zone at various speeds. FIG. 5D and diagrams 545, 550, and 555 illustrate an impact to a right zone at various speeds. The aforementioned testing can be used calculate g-values. G-values can be used by a communicator for comparison with a g-threshold to determine the severity of an impact. The severity of an impact can be calibrated by mapping g-values or g-thresholds to HIC.

Figure 6:
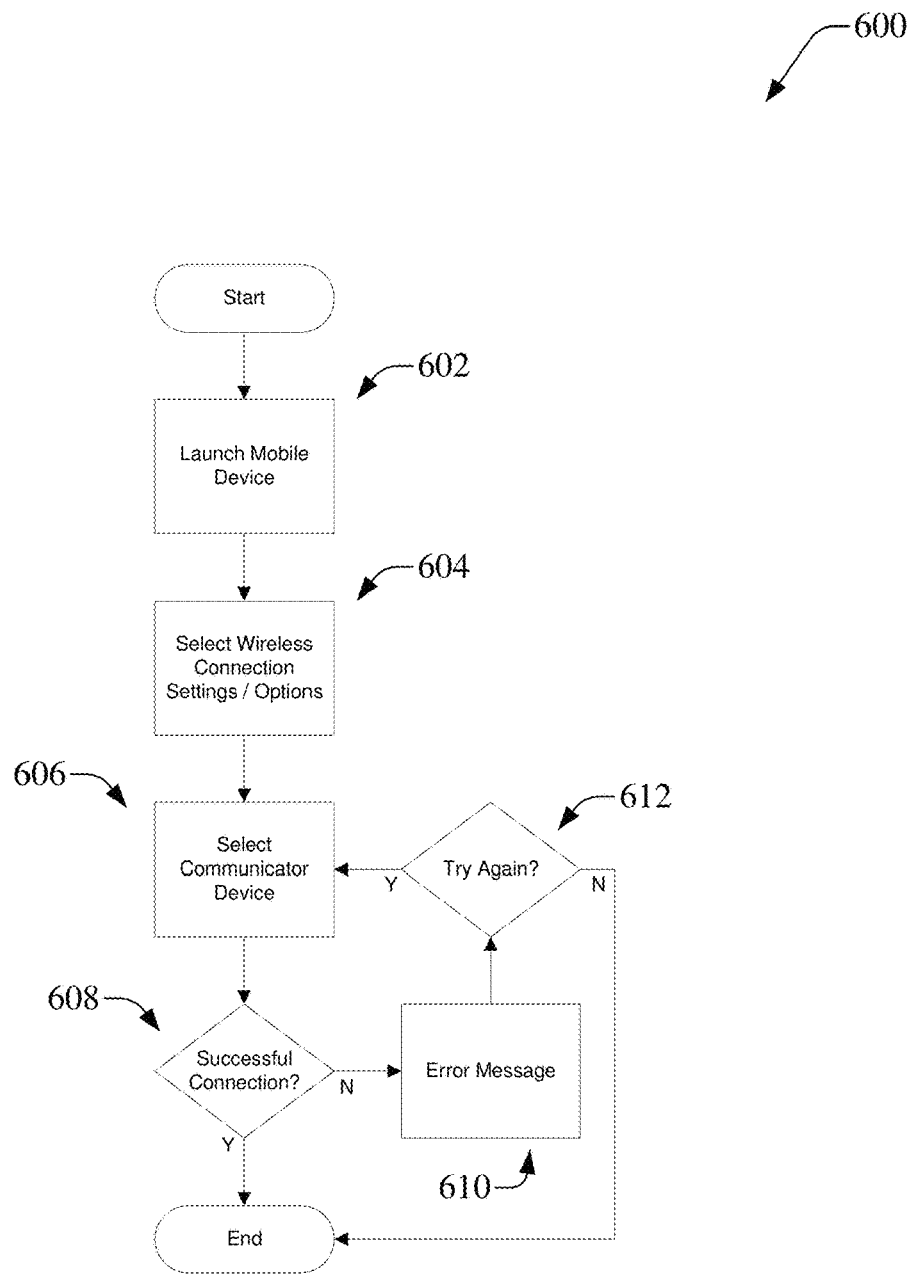
FIG. 6 is a flowchart of an example method for connecting a communicator to a mobile device in accordance with one or more embodiments described herein.

Turning to FIG. 6, a flowchart of a process 600 for pairing a communicator device (e.g., communicator 102 as described above with respect to FIG. 1) to a mobile device (e.g., mobile device 104 as described above with respect to FIG. 1) is shown. The communicator device be can be powered on or can be in a pairing mode. At 602, a mobile device is launched. The mobile device can be powered on from an off-state or can be awoken from an in active state or unlocked. At 604, the wireless connection settings/options on the mobile device are selected. For example, Wi-Fi or Bluetooth settings can be launched. The exact sequence can depend on the type of mobile device used. The connection type can depend on the type of wireless connection to the communicator device. At 606, the communicator device is selected. For example, the name of the connection wireless connection can correspond to the name or brand of the communicator device. At 608, the process ends with a successful connection or an error message can be prompted at 610 for an unsuccessful connection, depending on the type of mobile device used. At 612, an additional attempt at connecting the mobile device and communicator device can be made. If another attempt is made, the process returns to 606, otherwise the process can end.

Figure 7:
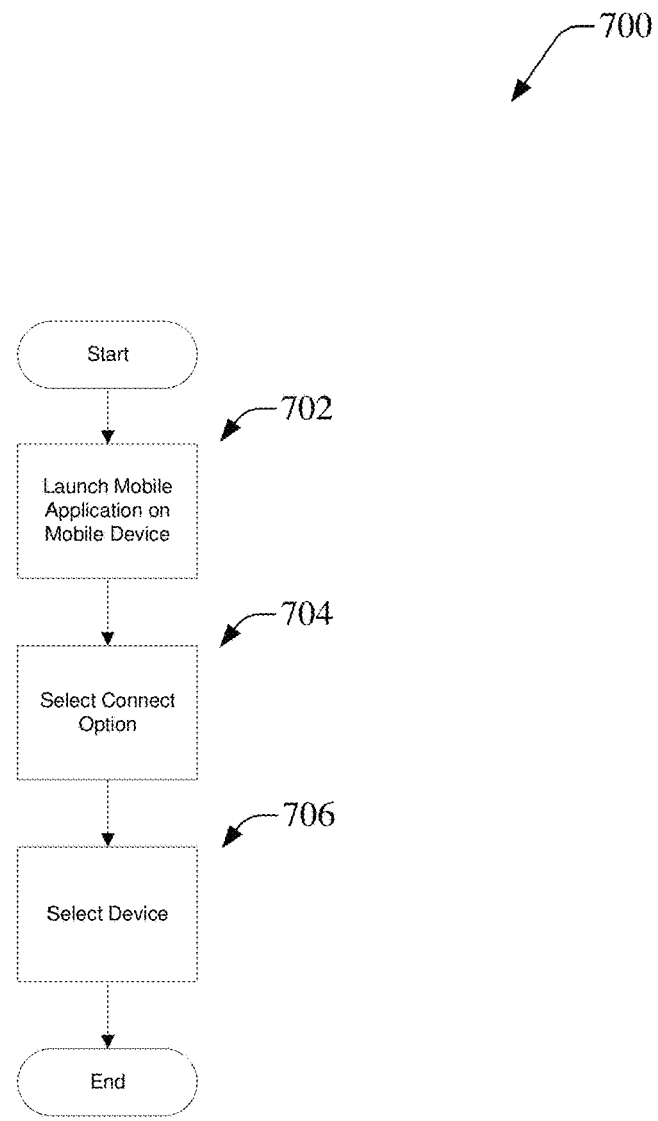
FIG. 7 is a flowchart of an example method for pairing a communicator with a mobile application in accordance with one or more embodiments described herein.

Turning now to FIG. 7, a flowchart of a process 700 for connecting a communicator device to a mobile application (e.g., APP 106 as described above with respect to FIG. 1) is shown. Process 700 can occur after a successful pairing, as in process 600 above. At 702, a mobile application is launched. At 704, a connect option is selected on the mobile application. At 706, the communicator device is selected. Additional information or configuration settings or options can also be entered. After completion of step 706, the process ends.

Figure 8:
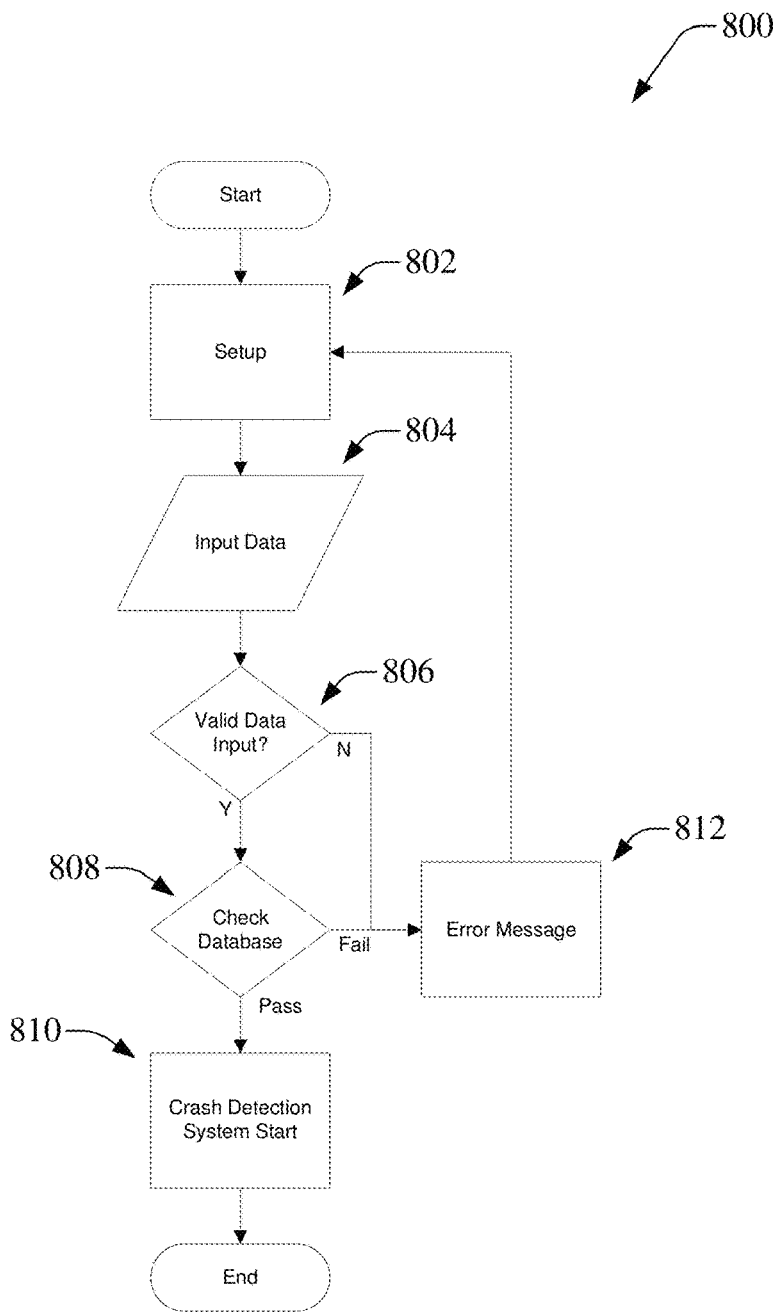
FIG. 8 is a flowchart of an example method for setting up information for use in a safety system in accordance with one or more embodiments described herein.

Referring now to FIG. 8, a flowchart of a process 800 for initializing a data entry process is shown. This process can be conduced on a mobile application which can be associated with a communicator device. At 802, setup can be launched. Setup can be launched in a mobile application such as APP 106. Next, data can be input at 804. The data can include one or a variety of components. For example, details including, but not limited to: user's name, age, sex/gender, weight, eye color, hair color, race/ethnicity, home address, work address, phone number, insurance information, allergies, medications, ailments, diseases, conditions, doctor information, or other personal details can be entered. Other information such as one or more of: an emergency contact name, emergency contact phone number, or emergency contact email address can also be entered. At 806, a mobile application or system checks whether a data component is valid. If not valid (e.g., too many characters, too few characters, contains in invalid character, contains a prohibited character, etc.), the process proceeds to 812 where an error message is generated and the system returns to 802 (or a different step) so that the invalid data component can be corrected and another attempt at entering can be made. The error message at 812 can include a reason for the invalidity. If the data component is valid, the process proceeds to 808 where a database is checked. A data component can be checked against the database, for problems (e.g., duplicate entry, prohibited entry, etc.). If there is a problem, or if the database check is unsuccessful for some other reason, then an error message is generated at 812, which can include a reason for the failure, and the process can return to 802 (or a different step). The database can be stored on a remote location or server, in the mobile application, on the mobile device, or some other location. If checking the database at 808 yields a pass, then the process proceeds to 810 where a crash detection system can be started and process 800 can end.

Figure 9:
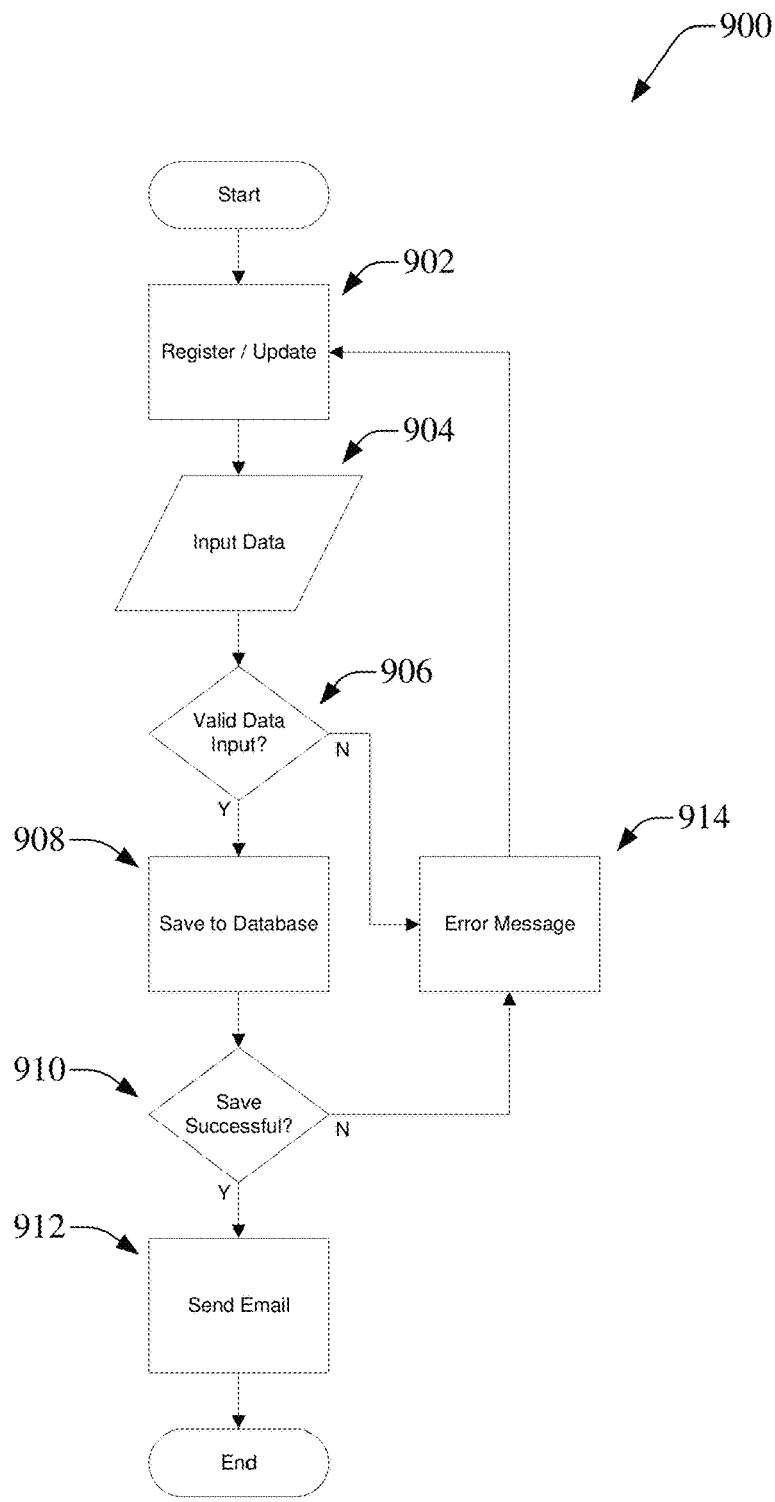
FIG. 9 is a flowchart of an example method for updating or registering information of a safety system in accordance with one or more embodiments described herein.

Referring now to FIG. 9, a flowchart of a process 900 for registering a person or updating information is shown. Like process 800, process 900 can be conducted on a mobile application and can be associated with a communicator device. At 902, the process can be launched. Next, data can be input at 904. The data can include one or a variety of components, such as the data described above in step 804 of FIG. 8. At 906, a mobile application or system checks whether a data component is valid. If not valid, the process proceeds to 914 where an error message is generated and the system returns to 902 (or a different step) so that the invalid data component can be corrected and another attempt at entering can be made. The error message at 914 can include a reason for the invalidity. If the data component is valid at 906, the process proceeds to 908 where the data component is saved to a database. At 910, if there is a problem saving to the database, or if there is some other problem, then an error message is generated at 914, which can include a reason for the failure, and the process can return to 902 (or a different step). The database can be stored on a remote location or server or in the mobile application or mobile device. If saving to the database at 908 yields a success at 910, then the process proceeds to 912 where an email is sent. According to an embodiment, the email can be a confirmation email sent a registered user of the mobile application on which the registering or updating occurred. In another embodiment, the email can be sent to an emergency contact, for example, to notify the emergency contact that the person is now an emergency contact registered with the mobile application, communicator device, or a user of the mobile application or communicator device. In other embodiments, at step 912, the mobile application or system can send a different type of notification, for example, a text message, telephone call or voicemail, push notification, physical mailing, or other type of alert.

Figure 10:
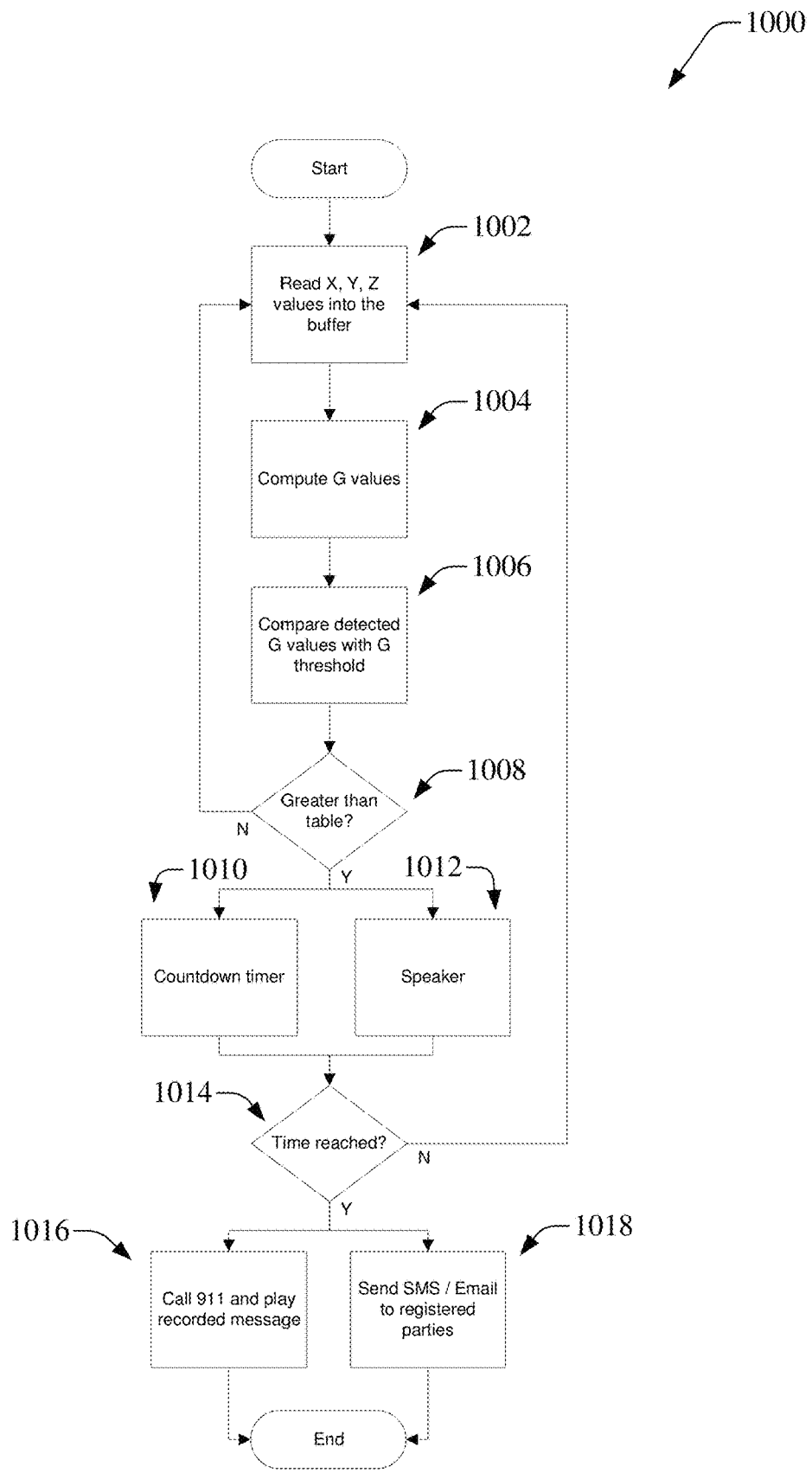
FIG. 10 is a flowchart of an example method for a safety system in accordance with one or more embodiments described herein.

Turning now to FIG. 10, a flowchart of a process 1000 for a crash detection process is shown. At 1002, X, Y, and Z values are read into a buffer from an impact sensor (e.g., 3-axis accelerometer). In other embodiments, different data types can be received at 1002 as would be understood to aid in the computation of a g-force-value. At 1004, raw data from 1002 is used to compute g-values corresponding to g-forces. At 1006, the computed g-values are compared with a g-threshold. The g-threshold can correspond to the direction, region, intensity, speed, or other parameter of a crash or impact. HIC data can be utilized in the determination of the g-threshold. If, at 1008, a g-value is less than a corresponding g-threshold, then the system returns to 1002 and continues monitoring. If, at 1008, a g-value is greater than or equal to a corresponding g-threshold, then the process proceeds to 1010 and 1012 (or only one of 1010 and 1012). In other embodiments, if, at 1008, a g-value is greater than or equal to a corresponding g-threshold, then the process can proceed directly to 1016 or 1018 (or both). At 1010, a countdown timer is initiated. The countdown time can count down from, for example, 30 seconds or any other configured amount of time. At 1012, an audible alert is broadcast over a speaker. The speaker can be a component of a helmet communicator, mobile device, or other component communicatively coupled to a communicator or mobile device, such as headphones, earbuds or a helmet. The speaker can broadcast an alert at the commencement of the countdown timer. Other embodiments can generate a visual alert, visual cue, or other notification method appearing on a display or other component of a mobile device, communicator device, or other device. According to an embodiment, the alert can continue until the countdown timer reaches a value or until the countdown timer is stopped in advance of reaching a value. In an embodiment, the alert can vary depending on the amount of time elapsed or remaining on the countdown timer. If, at 1014, the countdown timer reaches a value, such as 0, the process continues to 1016 and 1018 (or only one of 1016 and 1018). If, at 1014, a timer does not reach a value, such as in the case of being stopped by a user indicating a false alarm, the system can return to 1002. The countdown timer can be stopped, for example, by a button push, screen tap, gesture (e.g., gesture of one of FIGS. 3A-3I or 4A-4E or other gesture) or voice command at a communicator, mobile device, or other device or component communicatively coupled to a communicator or mobile device. At 1016, emergency services are contacted. According to an embodiment, 911 can be called and played a recorded message. The recorded message can include information such as location data (e.g., street address or GPS coordinates) or the type or magnitude of impact sustained. In other another embodiment, 911 could be dialed and enabled to communicate with a user of the communicator device. In yet another embodiment, a text-based message, such as a text message, email, or push notification can be relayed to emergency services. At 1018, a text-based message is sent to parties (e.g., emergency contacts) registered to receive communication in response to an impact detected by a communicator. In another embodiment, a recorded message or phone dialing can be sent to or initiated with a registered party, comprising information as would be provided in step 1016. Steps 1016 and 1018 can be performed, depending on preferences, laws, rules, regulations, etc. After step 1016 or 1018 (or both) the process ends.

Figure 11:
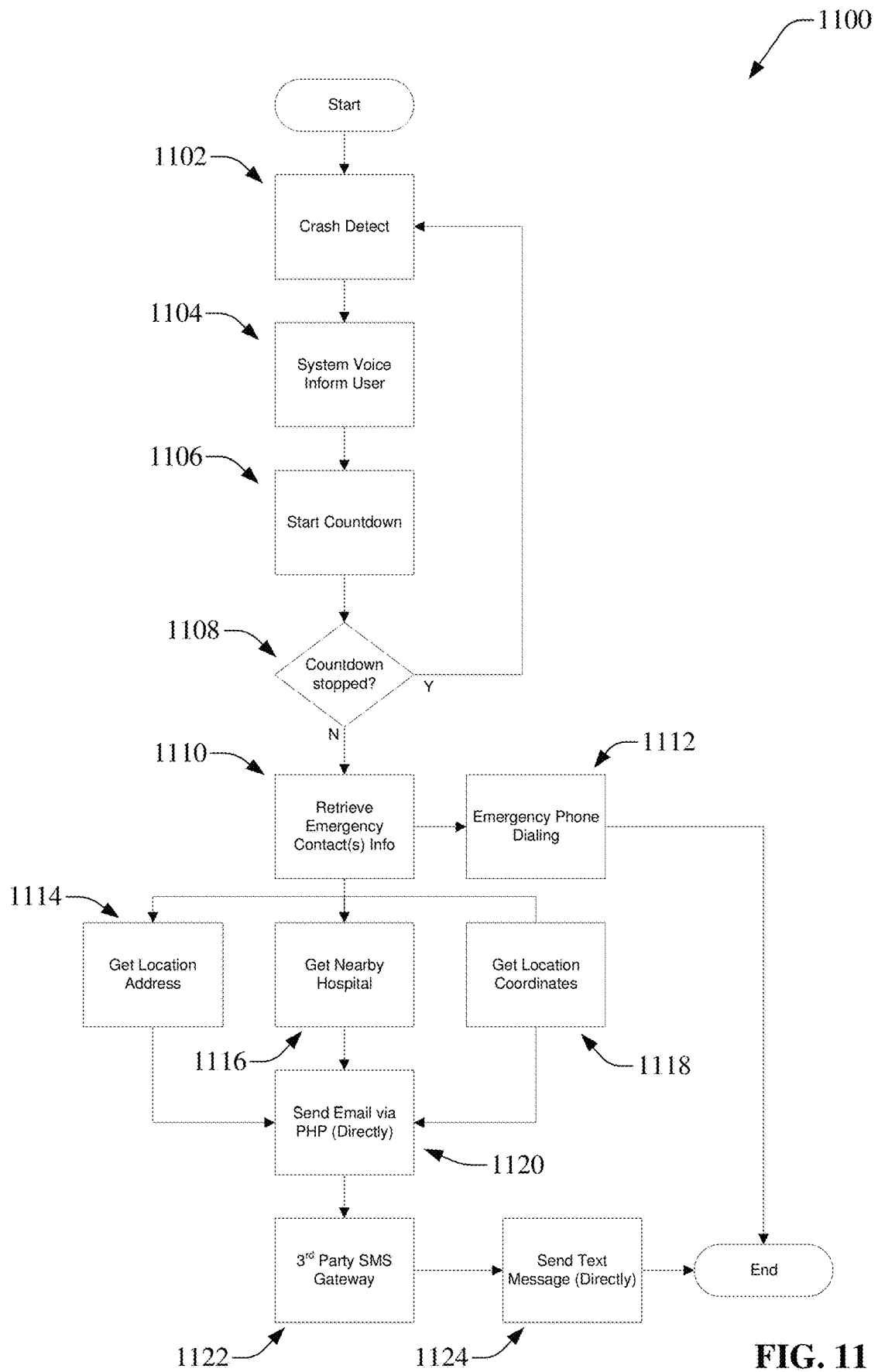
FIG. 11 is a flowchart of an example method for a safety system in accordance with one or more embodiments described herein.

With reference to FIG. 11, a flowchart of a process 1100 for a crash detection process is shown. At 1102, a crash is detected. The crash can be determined by recording a g-value greater than or equal to a corresponding g-threshold. At 1104, a crash detection system can inform a user of the detection. According to an embodiment, a user can be informed by a system voice providing information relating to the crash. The voice can be broadcast, for example, over a speaker, headphones, earbuds, at a mobile device, etc. In another embodiment, a visual message can be displayed on a screen (e.g., screen of a mobile device as a registered component of a crash detection system). At 1106, a time is started. The timer can count down from or count up to a value. The value can be user-configurable or locked (protected from user-adjustment). The informing from step 1104 can continue during step 1106. At 1108, the sequence is returned to 1102 if the timer is stopped before reaching a value. This can occur, for example, if a user marks himself or herself as safe and not in need of assistance (e.g., in the case of a communicator or helmet having a communicator attached thereon being dropped while not worn). If the timer reaches a value, then the process can continue to 1110. In other embodiments, a timer can be stopped and still proceed to 1110 (e.g., user marks himself or herself as injured negating the need to wait for a full timer sequence). At 1110, emergency contact information is retrieved. This can include registered parties or emergency services (e.g., emergency contact information entered at step 804 of process 800). At 1114, an address associated with the crash or impact is obtained. This can be determined by a GPS component of a communicator or by using components (such as GPS) inherent to a mobile device communicatively coupled to a communicator. Likewise, GPS coordinates can be determined at 1118. At 1116, hospital(s) nearby the location associated with the crash or impact are determined. The hospital nearby can be determined "as the crow flies", based upon actual navigable distance, or estimated time to travel to a hospital. The nearby hospitals can conform to user-preferences, such as hospitals accepting a user's insurance or having preferred doctors or specializing in head-injuries. At 1112, the registered parties or emergency services are dialed. A voicemail comprising a preregistered message or live communication with a registered party or emergency service can be established. According to an embodiment, the phone recording can include information from steps 1114, 1116, or 1118 (step 1112 can occur before or after any or all of steps 1114, 1116, and 1118). At 1120, an email can be sent. In an embodiment, a mobile device can be caused to send an email to a registered party or emergency service can be established via its native email application or a $3^{rd}$ party mail application. Sometimes, however, a different method for emailing is required due to software or hardware restrictions of a particular mobile device. Therefore, in another embodiment, a mobile application configured for use with a communicator device can have email capability such that the email can be sent by the mobile application, thus not requiring a native email application of a mobile device. In yet another embodiment, the email can be sent by a remote server or computer configured to send an email on behalf of a communicator, mobile device, or mobile application. The email can be sent, for example, with a PHP script. At 1122, a text message can be sent to a registered party or emergency service. Sometimes, software or hardware restrictions of a particular mobile device prevent use of a native messaging application. Therefore, a $3^{rd}$ party messaging gateway can be utilized. This way, a mobile application can cause a remote computer or server to send a text message on its behalf, thereby complying with software or hardware restrictions while still sending a message to the desired recipients. At 1124, a text message can be sent to a registered party or emergency service via a native messaging application for a mobile device when possible.

Figure 12:
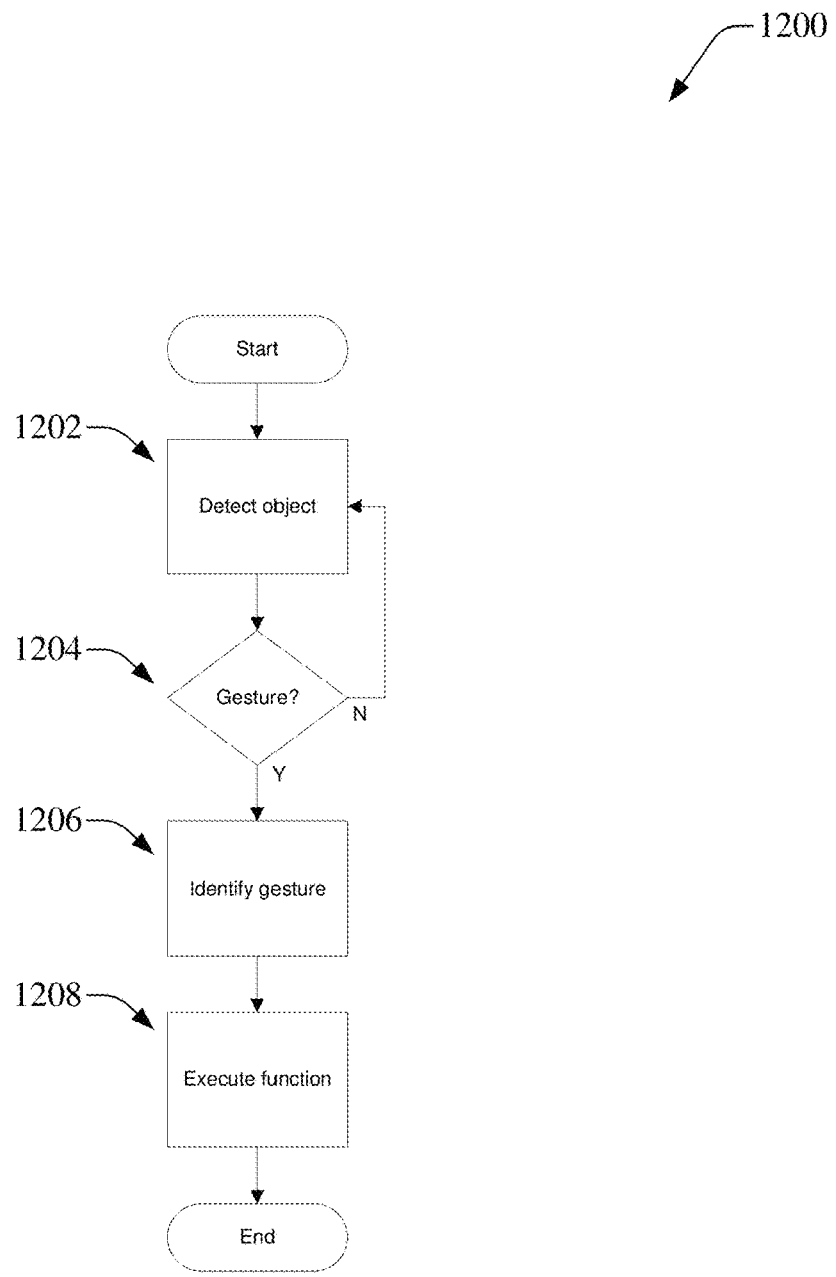
FIG. 12 is a flowchart of an example method for a gesture-initiated function in accordance with one or more embodiments described herein.

Turning now to FIG. 12, a flowchart of a process 1200 for communicator gesture control is shown. At 1202, an object (e.g., object 202) is detected. The object can be detected with a sensor of a communicator. The communicator can, for example, detect distance or signal amplitude from the sensor. The communicator can have distance limits, amplitude limits, or thresholds that correspond to an object being too far or too close for gesture processing. For example, a distance of greater than 300 mm may be detectable by a sensor of a communicator, but can be not considered for the purposes of gesture evaluation. In another example, an amplitude too large (or too small) can correspond to an object being detectable but again too far for gesture processing. At 1204, it is determined whether a gesture occurred. This can be a cursory check to see if a gesture occurred at all. According to an embodiment, there can be basic threshold requirements that all gestures fall within which can be checked at 1204. In other embodiments, a specific gesture can be recognized at 1204. If, at 1204, a gesture does not exist, the system continues detecting at 1202. If, at 1204, a gesture exists, the gesture is next identified at 1206. At 1206, the analysis is more sophisticated such that the object detection data can be matched to a specific gesture performed by the object. Gestures can be certain patterns yielding certain threshold values and amounts of time. Nonlimiting examples of such gestures can be appreciated in FIGS. 3A-3I and 4A-4E. Once a specific gesture is identified at 1206, a function can be executed at 1208. Functions can vary greatly depending on which of many gestures is identified. According to an embodiment, music can be controlled on a mobile device communicatively coupled to a communicator. Music control can include, for example, volume increase or decrease, play, pause, skip track, previous track, shuffle, repeat, like song, add to playlist, fast forward, rewind, etc. In another embodiment, a telephone call can be controlled. For example, a call can be answered, ignored, sent to voicemail, ended, forwarded, have volume increased or decreased, etc. In yet another embodiment, a gesture can cause a communicator to send an output to a second communicator. The second communicator can be, for example, connected to the first communicator over a mesh communicator network. Other functions not hereby specified can also occur as would be appreciated by one skilled in the art.

Figure 13:
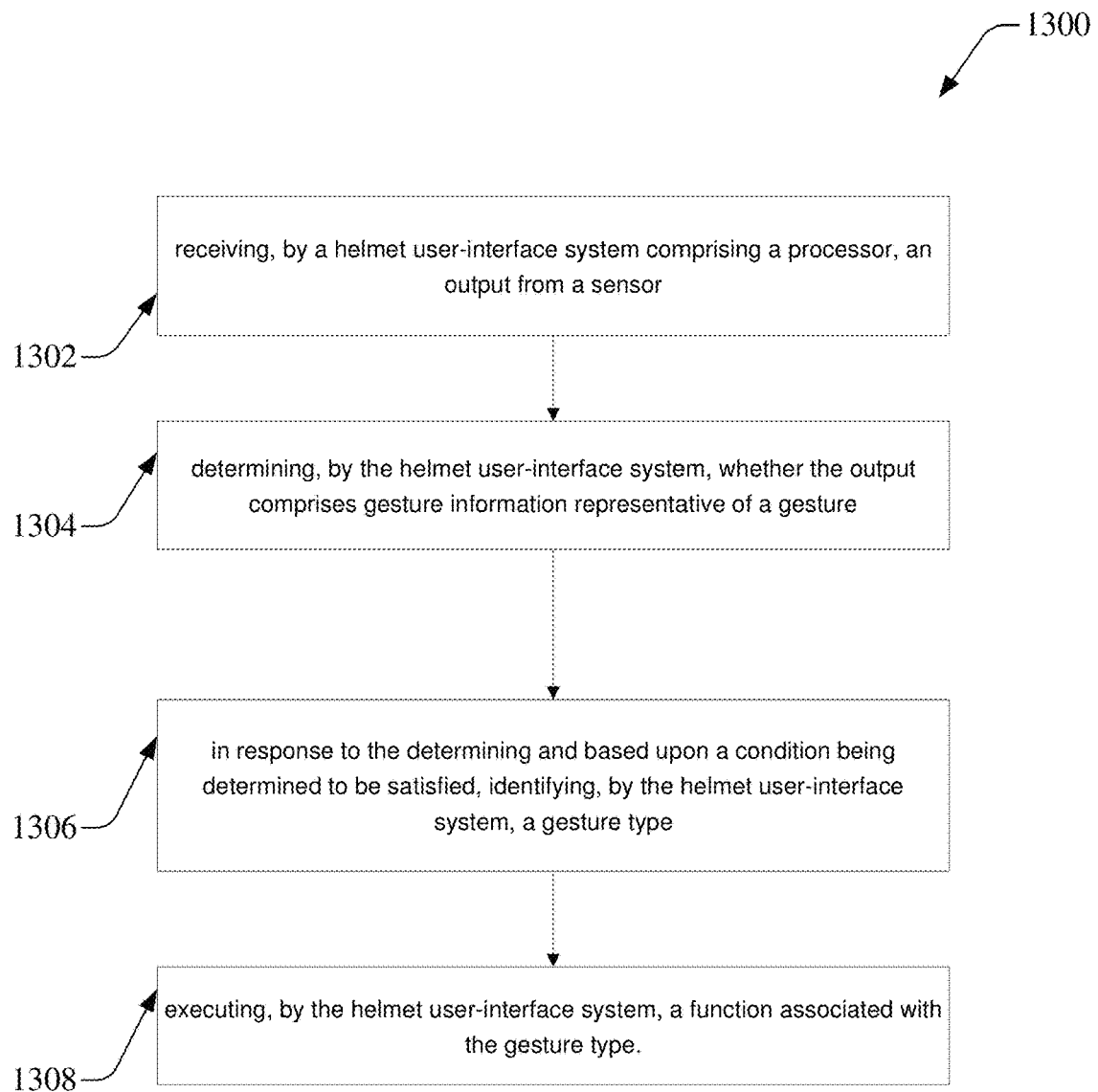
FIG. 13 is a block flow diagram for a process for a method in which a helmet user-interface system receives an output from a sensor and ultimately executes a function associated with a gesture type in accordance with one or more embodiments described herein.

Turning next to FIG. 13, illustrated is a flow diagram of a process 1300 for gesture-based function in accordance with one or more embodiments described herein. At 1302, a helmet user-interface system comprising a processor (e.g., communicator 102) receives an output from a sensor (e.g., sensor 204).

At 1304, the helmet user-interface system determines whether the output comprises gesture information (e.g., gesture identified by microprocessor 208).

At 1306, in response to the determining, and based upon a condition being determined to be satisfied (e.g., positive determination that a gesture exists), the system identifies a gesture type (e.g., gesture corresponding to FIGS. 3A-3I or 4A-4E as identified by digital signal processor 212).

At 1308, the helmet user-interface system executes a function associated with the gesture type (e.g., controlling phone calls or music or other communication or entertainment functions).

Figure 14:
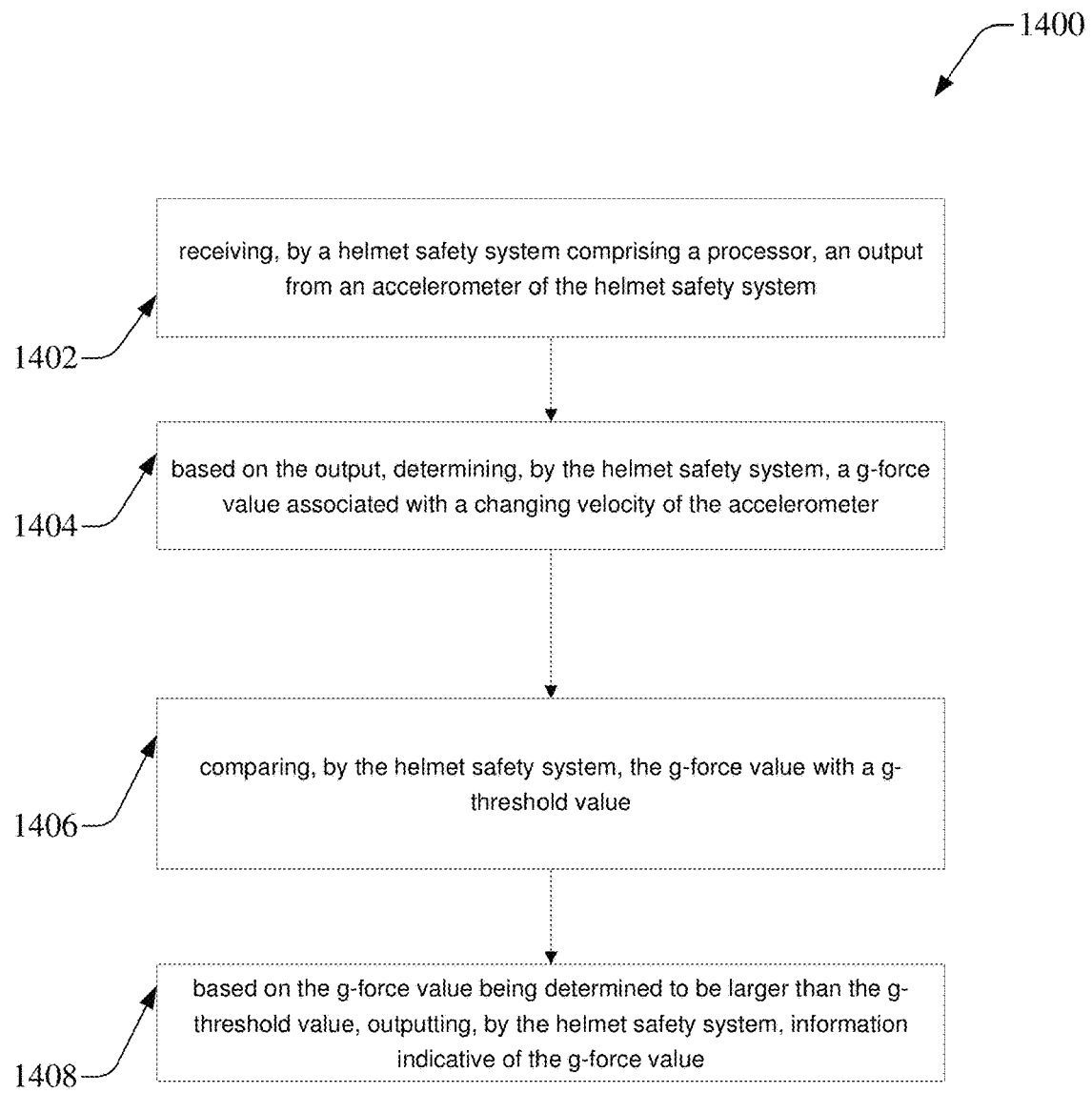
FIG. 14 is a block flow diagram for a process for a method in which a helmet safety system receives an output from a sensor and ultimately outputs information indicative of a g-force value in accordance with one or more embodiments described herein.

FIG. 14 illustrates a flow diagram of a process 1400 for receiving, processing, and relaying information relating to g-force values. At 1402, a helmet safety system (e.g., communicator 102), receives an output from an accelerometer.

At 1404, based upon the output at 1402, the helmet safety system determines a g-force value associated with a changing velocity of the accelerometer.

At 1406, the helmet safety system compares the g-force value a g-threshold value.

At 1408, based on the g-force value being determined to be larger than the g-threshold value, the helmet safety system outputs information indicative of the g-force value.

Figure 15:
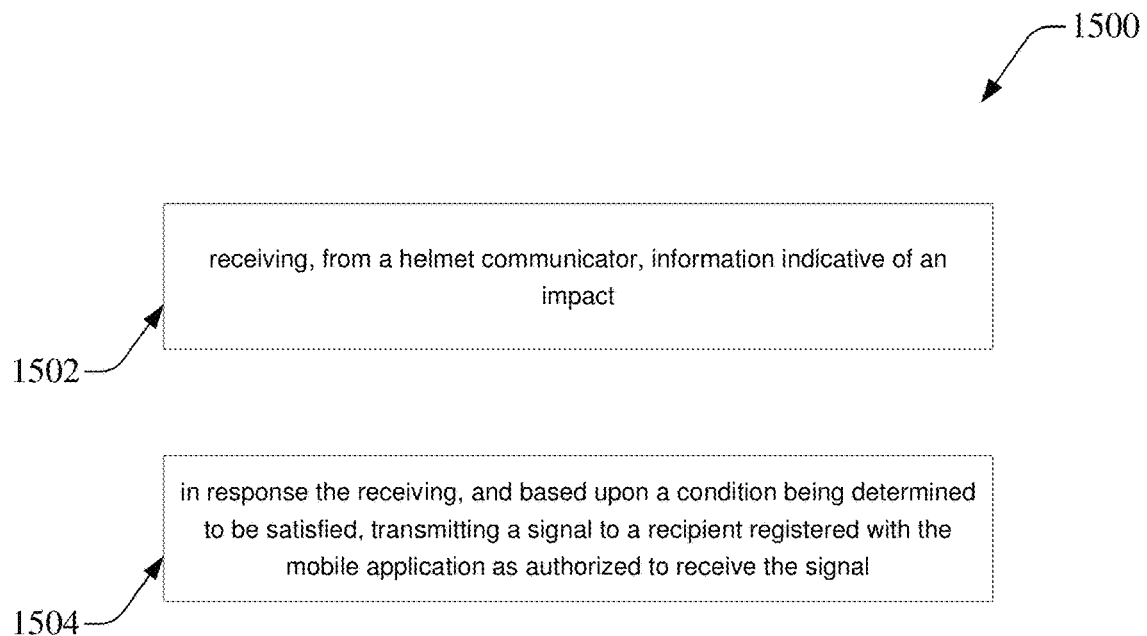
FIG. 15 is a block flow diagram for a process for a system in which system receives information indicative of a condition and transmits a signal in accordance with one or more embodiments described herein.

FIG. 15 illustrates a flow diagram of steps taken by a system comprising mobile device comprising a mobile application installed and executing thereon, a processor, a memory that stores executable instructions that, when executed by the processor, facilitate performance of operations 1500. The operations can include at 1502, receiving information indicative of an impact from a helmet communicator (e.g. communicator 102).

At 1504, in response to receiving the information indicative of the impact and based upon a condition being determined to be satisfied (e.g., an elapsing of time after the receiving information without acquiring a cancellation input at a mobile device), the system transmits a signal to a recipient registered with the mobile application as authorized to receive the signal.

FIGS. 6-15 as described above illustrate respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 16:
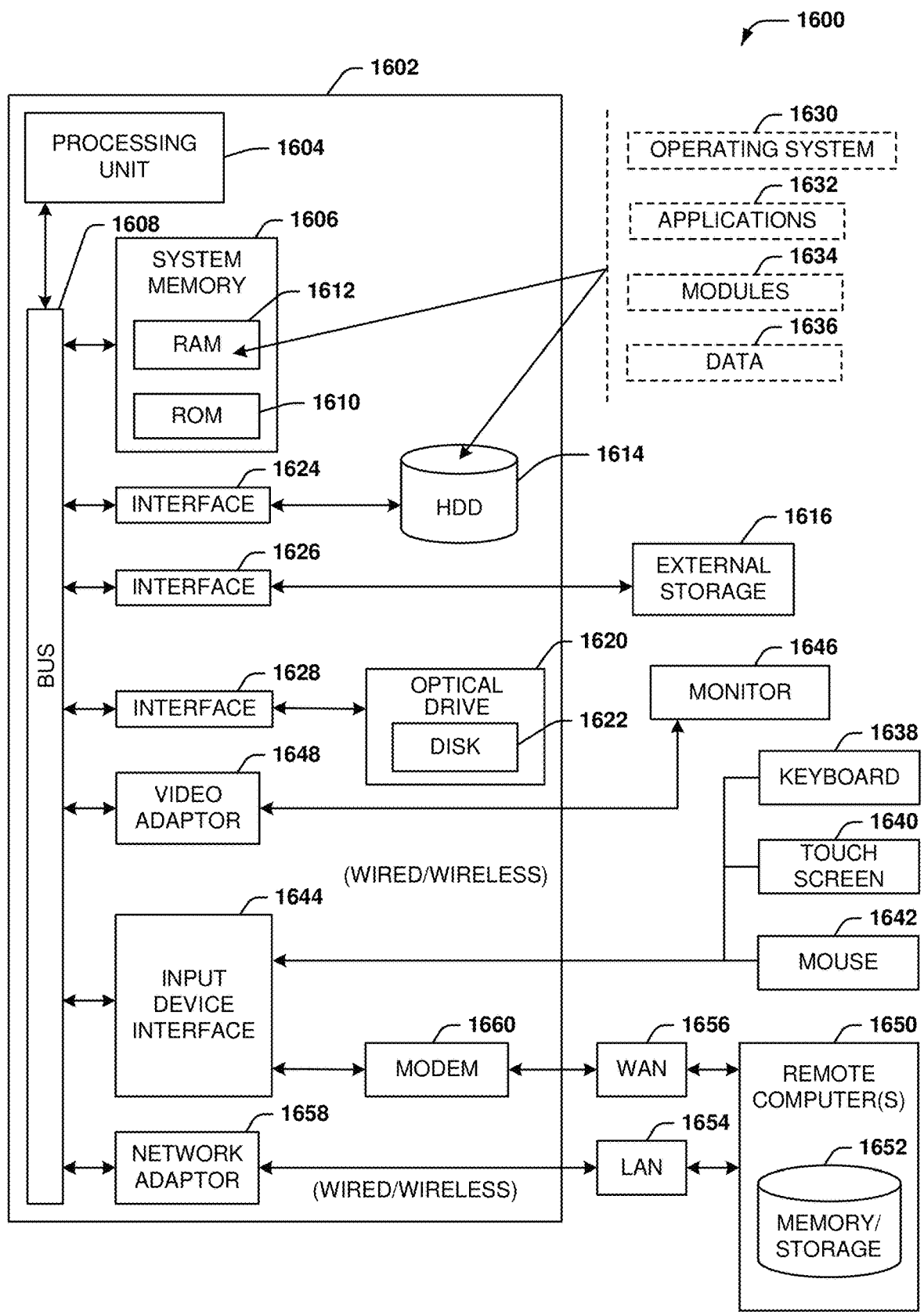
FIG. 16 is an example, non-limiting computing environment in which one or more embodiments described herein can be implemented.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1694 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 17:
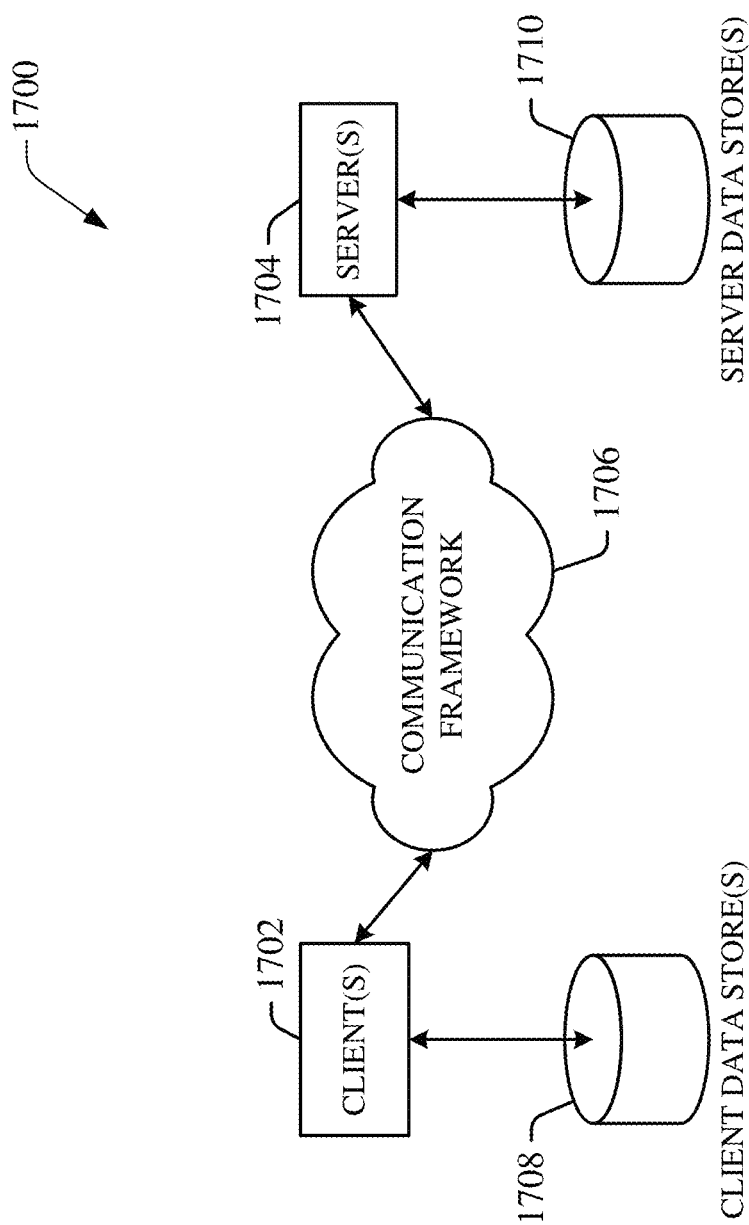
FIG. 17 is an example, non-limiting networking environment in which one or more embodiments described herein can be implemented.

Referring now to FIG. 17, there is illustrated a schematic block diagram of a computing environment 1700 in accordance with this specification. The system 1700 includes one or more client(s) 1702, (e.g., computers, smart phones, tablets, cameras, PDA's). The client(s) 1702 can be hardware and/or software (e.g., threads, processes, computing devices). The client(s) 1702 can house cookie(s) and/or associated contextual information by employing the specification, for example.

The system 1700 also includes one or more server(s) 1704. The server(s) 1704 can also be hardware or hardware in combination with software (e.g., threads, processes, computing devices). The servers 1704 can house threads to perform transformations of media items by employing aspects of this disclosure, for example. One possible communication between a client 1702 and a server 1704 can be in the form of a data packet adapted to be transmitted between two or more computer processes wherein data packets may include coded analyzed headspaces and/or input. The data packet can include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

In one exemplary implementation, a client 1702 can transfer an encoded file, (e.g., encoded media item), to server 1704. Server 1704 can store the file, decode the file, or transmit the file to another client 1702. It is to be appreciated, that a client 1702 can also transfer uncompressed file to a server 1704 and server 1704 can compress the file and/or transform the file in accordance with this disclosure. Likewise, server 1704 can encode information and transmit the information via communication framework 1706 to one or more clients 1702.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a helmet user-interface system comprising a processor, an output from a sensor;
   determining, by the helmet user-interface system, whether the output comprises hand motion recognition information representative of a gesture, wherein the hand motion recognition information comprises pattern information indicative that a hand has traversed a space within a defined range of the sensor, and distance information indicative of an average distance of the hand from the sensor during traversal of the space;
   in response to the determining and based on a condition being determined to be satisfied, identifying, by the helmet user-interface system, a gesture type associated with the hand motion recognition information; and
   executing, by the helmet user-interface system, a function associated with the gesture type, wherein the function facilitates entertainment, communication, or safety.

2. The method of claim 1, wherein the gesture is detected to have occurred less than or equal to about 30 centimeters from the sensor.

3. The method of claim 1, wherein the sensor comprises a proximity sensor.

4. The method of claim 1, further comprising:
   in response to the executing the function, transmitting, by the helmet user-interface system, a signal to a mobile device communicatively coupled to the system.

5. The method of claim 4, wherein the transmitting causes the mobile device to perform a task corresponding to the signal, and wherein the task comprises at least one of managing music or initiating a telephone call.

6. The method of claim 1, wherein the condition being determined to be satisfied comprises at least one of:
   the output comprising the hand motion recognition information representative of the gesture, the hand motion recognition information matching the gesture type, the output being contained within a distance limit or threshold, a gesture-input setting of helmet user-interface system being enabled, or the helmet user-interface system being communicatively coupled to a mobile device.

7. The method of claim 1, further comprising:
   generating, by the helmet user-interface system, confirmation feedback associated with the gesture type.

8. A method, comprising:
   receiving, by a helmet user-interface system comprising a processor, an output from a sensor;
   determining, by the helmet user-interface system, whether the output comprises trackable device motion recognition information representative of a gesture, wherein the trackable device motion recognition information comprises pattern information indicative that a trackable device has traversed a space within a defined range of the sensor, and distance information indicative of an average distance of the trackable device from the sensor during traversal of the space;
   in response to the determining and based on a condition being determined to be satisfied, identifying, by the helmet user-interface system, a gesture type associated with the trackable device motion recognition information; and
   executing, by the helmet user-interface system, a function associated with the gesture type, wherein the function facilitates entertainment, communication, or safety.

9. The method of claim 8, wherein the gesture is detected to have occurred less than or equal to about 30 centimeters from a sensor.

10. The method of claim 8, wherein the trackable device is a trackable ring or a trackable glove.

11. The method of claim 8, further comprising:
in response to the executing the function, transmitting, by the helmet user-interface system, a signal to a mobile device communicatively coupled to the system.

12. The method of claim 11, wherein the transmitting causes the mobile device to perform a task corresponding to the signal, and wherein the task comprises managing music.

13. The method of claim 8, wherein the condition being satisfied comprises at least one of:
the output comprising the trackable device information representative of the gesture, the trackable device information matching the gesture type, the output being contained within a distance limit, a gesture-input setting of helmet user-interface system being enabled, or the helmet user-interface system being communicatively coupled to a mobile device.

14. The method of claim 8, further comprising:
generating, by the helmet user-interface system, confirmation feedback associated with the gesture type.

15. A non-transitory machine-readable medium, comprising executable instructions that, when executed by a processor, facilitate performance of operations, comprising:
receiving an output from a sensor;
determining whether the output comprises hand motion recognition information representative of a gesture, wherein the hand motion recognition information comprises information indicative that a hand has traversed a space within a defined range of the sensor, and distance information representative of an average distance of the hand from the sensor during traversal of the space;
in response to the determining and based on a condition being determined to be satisfied, identifying a gesture type associated with the gesture information; and
executing a function associated with the gesture type, wherein the function facilitates entertainment, communication, or safety.

16. The non-transitory machine-readable medium of claim 15, wherein the gesture is detected to have occurred less than or equal to about 30 centimeters from the sensor.

17. The non-transitory machine-readable medium of claim 15, wherein the sensor comprises a proximity sensor.

18. The non-transitory machine-readable medium of claim 15, wherein the operations further comprise:
in response to the executing the function, transmit a signal to a mobile device communicatively coupled to the system.

19. The non-transitory machine-readable medium of claim 18, wherein the transmitting causes the mobile device to perform a task corresponding to the signal, and wherein the task comprises initiating a telephone call.

20. The non-transitory machine-readable medium of claim 15, wherein the condition being determined to be satisfied comprises at least one of:
the output comprising the hand motion recognition information representative of the gesture, the hand motion recognition information matching the gesture type, or the output being contained within a distance threshold.

* * * * *